(12) United States Patent  
Miyake et al.

(10) Patent No.: US 6,789,090 B1  
(45) Date of Patent: Sep. 7, 2004

(54) VIRTUAL NETWORK DISPLAYING SYSTEM

(75) Inventors: Shigeru Miyake, Tokyo (JP); Tomohiro Morisada, Matsuyama (JP); Satoru Tezuka, Yokohama (JP); Satoshi Miyazaki, Yamato (JP); Yoshiyuki Kurosaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/323,251

(22) Filed: Jun. 1, 1999

(30) Foreign Application Priority Data

May 29, 1998 (JP) .......................................... 10-149322

(51) Int. Cl.[7] .......................... G06F 7/00; G06F 15/173
(52) U.S. Cl. ................................... 707/104.1; 709/223
(58) Field of Search ............................. 709/100, 224, 709/223, 250, 221, 222, 225; 370/396, 397, 400; 707/10, 9, 5, 104.1

(56) References Cited

U.S. PATENT DOCUMENTS

| | | | |
|---|---|---|---|
| 5,550,816 A | * 8/1996 | Hardwick et al. | 370/397 |
| 5,633,869 A | * 5/1997 | Burnett et al. | 370/396 |
| 5,764,911 A | 6/1998 | Tezuka et al. | 709/223 |
| 5,805,804 A | * 9/1998 | Laursen et al. | 709/223 |
| 5,958,012 A | * 9/1999 | Battat et al. | 709/224 |
| 6,041,349 A | 3/2000 | Sugauchi et al. | 709/223 |
| 6,047,320 A | * 4/2000 | Tezuka et al. | 709/223 |
| 6,289,380 B1 | * 9/2001 | Battat et al. | 709/224 |

OTHER PUBLICATIONS

Local and Metropolitan Area Networks, IEEE Standard for Virtual Bridged Local Area Networks, IEEE Standard 802.1Q–1998, Mar. 8, 1999, pp. 1–17.

* cited by examiner

Primary Examiner—Uyen Le
Assistant Examiner—Te Yu Chen
(74) Attorney, Agent, or Firm—Antonelli, Terry, Stout & Kraus, LLP

(57) ABSTRACT

A network management system for managing a computer network in which media switching type infrastructures and media sharing type infrastructures are combined coexistently includes a database destined for network management in which correspondences established among information concerning physical interconnections of individual equipment on the network, information concerning logical network configuration such as that of virtual network, and information concerning the users who make use of the network are stored, identifying devices for identification of the individual equipment on the network and physical addresses intrinsic to network ports, respectively, and retrieval engines for searching information of the physical addresses of the network ports with queries for the logical addresses.

19 Claims, 18 Drawing Sheets

FIG.12

| IP ADDRESS | STATUS | MAC ADDRESS | |
|---|---|---|---|
| 192.168.11.0 | RESERVED | 00:00:00:22:11:42 | ~541a |
| 192.168.11.1 | RESERVED | 00:00:00:22:98:72 | ~541b |
| 192.168.11.2 | ACTIVE | 00:00:00:23:11:55 | ~541c |
| 192.168.11.3 | RESERVED | 00:00:00:a1:1a:fa | ~541d |
| 192.168.11.4 | ACTIVE | 00:00:00:22:11:8a | ~541e |
| 192.168.11.5 | UNOCCUPIED | | ~541f |
| 192.168.11.6 | UNOCCUPIED | | ~541g |
| 192.168.11.7 | UNOCCUPIED | | ~541h |
| 192.168.11.8 | ACTIVE | 00:00:00:42:16:89 | ~541i |
| 192.168.11.9 | UNOCCUPIED | | ~541j |
| 192.168.11.10 | UNOCCUPIED | | ~541k |
| 192.168.11.11 | ACTIVE | 00:00:00:34:27:11 | ~541l |
| 192.168.11.12 | UNOCCUPIED | | ~541m |
| 192.168.11.13 | UNOCCUPIED | | ~541n |
| ⋮ | | | |
| 192.168.11.126 | RESERVED | 00:00:00:22:11:55 | ~541y |
| 192.168.11.127 | RESERVED | 00:00:00:aa:da:28 | ~541z |

501 = IP ADDRESS, 502 = STATUS, 503 = MAC ADDRESS, 50

| MAC ADDRESS | COMPUTER NAME | IP ADDRESS | STATUS | |
|---|---|---|---|---|
| 00:00:00:23:11:55 | LANEClient1 | 192.168.11.2 | ACTIVE | ~651c |
| 00:00:00:22:11:8a | LANEClient2 | 192.168.11.4 | ACTIVE | ~651e |
| 00:00:00:42:16:89 | LANEClient4 | 192.168.11.8 | ACTIVE | ~651i |
| 00:00:00:34:27:11 | Client1 | 192.168.11.11 | ACTIVE | ~651l |
| ------ | ------ | | | |
| 00:00:00:22:11:42 | LANEClient3 | 192.168.11.0 | BEEN RESERVED | ~651a |
| 00:00:00:22:98:72 | LANEClient5 | 192.168.11.1 | BEEN RESERVED | ~651b |
| 00:00:00:a1:1a:fa | Client2 | 192.168.11.3 | BEEN RESERVED | ~651d |
| 00:00:00:22:11:55 | Client3 | 192.168.11.12 | BEEN RESERVED | ~651y |
| 00:00:00:aa:da:28 | Client4 | 192.168.11.13 | BEEN RESERVED | ~651z |
| ------ | ------ | | | |
| 00:00:00:22:11:55 | Client9 | | UNIDENTIFIED | ~651y |
| 00:00:00:aa:da:28 | Client10 | | UNIDENTIFIED | ~651z |

61 / 62 / 63 / 64

VIRTUAL NETWORK DISPLAYING SYSTEM

CROSS REFERENCE TO RELATED APPLICATION

This application is related to application Ser. No. 09/062,648, filed Feb. 12, 1997, Ser. No. 08/971,621, filed Nov. 17, 1998, and Ser. No. 08/799,759, filed Feb. 12, 1997, now U.S. Pat. No. 5,764,911.

BACKGROUND OF THE INVENTION

The present invention relates to a network management technique suited advantageously for employment in a network in which media sharing type infrastructures and media switch type infrastructures coexist mixedly.

Heretofore, a router apparatus and a bridge apparatus have been widely used as the means for controlling communication traffics by dividing a network into a plurality of segments. Further, a high-speed/wide-band switch apparatus of ATM type (Asynchronous Transfer Mode) has also been developed and used for practical applications. As is stated in a draft of "IEEE 802.1q Standards" published by the Institute of Electrical and Electronics Engineers (IEEE) and disclosed in Japanese Unexamined Patent Application Publication No. 130421/1997 (JP-A-9-130421) as well, it is known to implement virtual networks, i.e., logical network segments for every network port under the control of the switch apparatus. However, there exist a plurality of standards for such virtual network systems or schemes which differ from one to another enterprise or from one to another industrial colleague.

On the other hand, as a scheme or system for managing machines or equipment on a network, SNMP (Simple Network Management Protocol) prescribed in "Request for Comment 1907 (RFC 1907) published by the Internet Engineering Task Force (IETF) is adopted. With this protocol, setup statuses of the individual machines or equipment can be surveyed and/or altered on an equipment-by-equipment basis.

Furthermore, as a method of managing information of the users who are making use of network and computers connected to the network by using a database, the directory services stipulated by "X.500" is adopted as the international standards.

The conventional systems or schemes mentioned above, however, suffer problems such as enumerated below.
1) In the conventional systems known heretofore, it is certainly possible to implement the logical network segments as the virtual networks by setting previously the network for relaying or repeating packets at the switch apparatus to thereby set up the physical interconnection status of machines or equipment and the logical interconnection status implemented by the virtual networks independent of each other. In that case, however, much difficulty is encountered in referencing or surveying the network configuration as a whole over a wide range and altering or modifying the same.

More particularly, because no consideration is paid to the structure of a database destined for consolidative management for the setup status and supervision of the whole virtual network realized by a plurality of equipment, it is extremely difficult in referencing or supervising and altering or modifying the setup status of the virtual network configuration and the network address structure over a plurality of machines or equipment.
2) Furthermore, with regard to the packaging of the virtual network, there have been proposed a plurality of different schemes. By way of example, for the asynchronous transfer mode or ATM, LAN emulation (hereinafter also referred to as the LANE) standardized by the standardization association "ATM Forum" is packaged, i.e., adopted actually. Furthermore, concerning the Ethernet switch apparatus, there exist various packaging schemes such as "VLAN Scheme" (IEEE802.1q) currently under discussion for the standardization by the International Standardization Association "IEEE" in addition to those which have been expanded or extended individually by diverse vendors.

Now, let's suppose a network environment in which a plurality of virtual networks of different package types such as mentioned above are combined coexistently. In such environment, it is certainly possible to connect mutually the virtual networks through the medium of the router apparatus. However, the method of referencing or supervising and altering the setup status of the virtual networks differs from one to another virtual network in dependence on the package types as adopted, involving necessity of performing the setup and other operations separately for each of the virtual networks. More specifically, when there arises the necessity of altering or changing the member equipment of the virtual network segments, it is required to alter the setup statuses thereof at the server apparatuses which are in charge of managing the associated virtual network segments, respectively, or the switch apparatuses or both of them.

In other words, when a plurality of virtual networks of different types are combined coexistently, an extreme difficulty will be encountered in managing the network as a whole while referencing or altering the setup statuses of the virtual networks in a consolidated manner at one location or station.
3) Besides, when configuration of the logical network segment implemented by the virtual network and that of the physical network are grasped in terms of a logical network configuration as viewed from the standpoint a higher-rank protocol, then the management of the virtual network configuration has to be performed separately from the management of the logical network layers with the internet protocol or IP. In such network system, it is impossible to grasp intuitively the physical equipment interconnections as well as relations with and among the logical network configurations. Consequently, when occurrence of obstacle or failure in the network system is detected, extreme difficulty will be involved in determining discriminatively the location where the failure or disturbance is taking place.

As will now be appreciated from the foregoing, with the conventional techniques, it is very difficult to realize a means which allows a person in charge of managing or supervising the network system to grasp intuitively the configuration or structure of the network system as a whole by establishing or grasping simultaneously correspondences among the logical network segment structures implemented as the virtual networks, the physical network configuration realized by physically wiring the equipment, and the logical network configuration as viewed from the standpoint of higher-rank protocols of variety.

SUMMARY OF THE INVENTION

In the light of the state of the art described above, it is an object of the present invention to provide a network management technique which is capable of managing easily a network system which includes a plurality of virtual networks realized in accordance with different schemes.

Another object of the present invention is to provide a network management system implemented by adopting the network management technique mentioned above.

Yet another object of the present invention is to provide individual apparatuses required for constituting the above-mentioned system.

Furthermore, it is an object of the present invention to provide programs for realizing the individual apparatuses.

In view of the above and other objects which will become apparent as the description proceeds, the present invention is directed to a network management system for managing a computer network in which a media switching type infrastructure and a media sharing type infrastructure are combined coexistently.

In the network management system mentioned above, it is taught according to a general aspect of the present invention that a database for network management is provided, in which correspondences are established among information concerning physical connections of equipment on the network, information concerning logical network configuration such as that of virtual network and information concerning users who make use of the network.

With the arrangement of the network management system mentioned above, management of the network including a plurality of virtual networks realized in accordance with respective schemes can be facilitated because the setup status of the virtual networks can be referenced, surveyed or altered easily in a consolidated manner owing to the provision of the service-destined database which is capable of storing the information concerning the physical interconnections of network equipment, the information concerning the logical virtual network configuration and the user information.

In a preferred mode for realizing the network management system according to the general aspect of the present invention described above, there may be provided a display unit which is capable of displaying the information concerning the physical network, the information concerning the logical network and the user information in the form of tree-structure type directory data.

In another mode for realizing the network management system according to the general aspect of the invention, it is preferred to provide a display means which is capable of disposing the physical network information, the logical network information and the user information on different planes, respectively, for displaying the information on all the planes three-dimensionally within a single frame.

In a further mode for realizing the network management system according to the general aspect of the invention, it is preferred to provide an identification means for identifying discriminatively the entities of individual equipment on the network as well as interconnection relations thereof by using physical addresses allocated inherently to network ports, respectively.

By virtue of the arrangements described above, it is possible to search (or retrieve) and alter the information concerning the interconnection relations among the physical network equipment, the information concerning the logical virtual network configuration and the user information in a consolidated manner by using as keys the physical addresses allocated to the physical network equipment, respectively.

In conjunction with the preferred mode for carrying out the invention described just above, it is preferred to provide a search or retrieve means which is capable of searching or retrieving the information of the physical addresses inherent to the network ports, respectively, in response to queries about the logical addresses.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 12 is a view for illustrating a structure of an address management table employed in an environment for carrying out dynamic address allocation in the network management system according to the invention;

FIG. 18 is a view for illustrating an example of a table for management of objects on the network, which table is employed in the network management system according to the invention.

DETAILED DESCRIPTION OF THE EMBODIMENTS

The present invention will be described in detail in conjunction with what is presently considered as preferred or typical embodiments thereof by reference to the drawings.

Now, a network management system according to an exemplary embodiment of the present invention will be described by reference to FIGS. 1 to 18.

Figure 1:
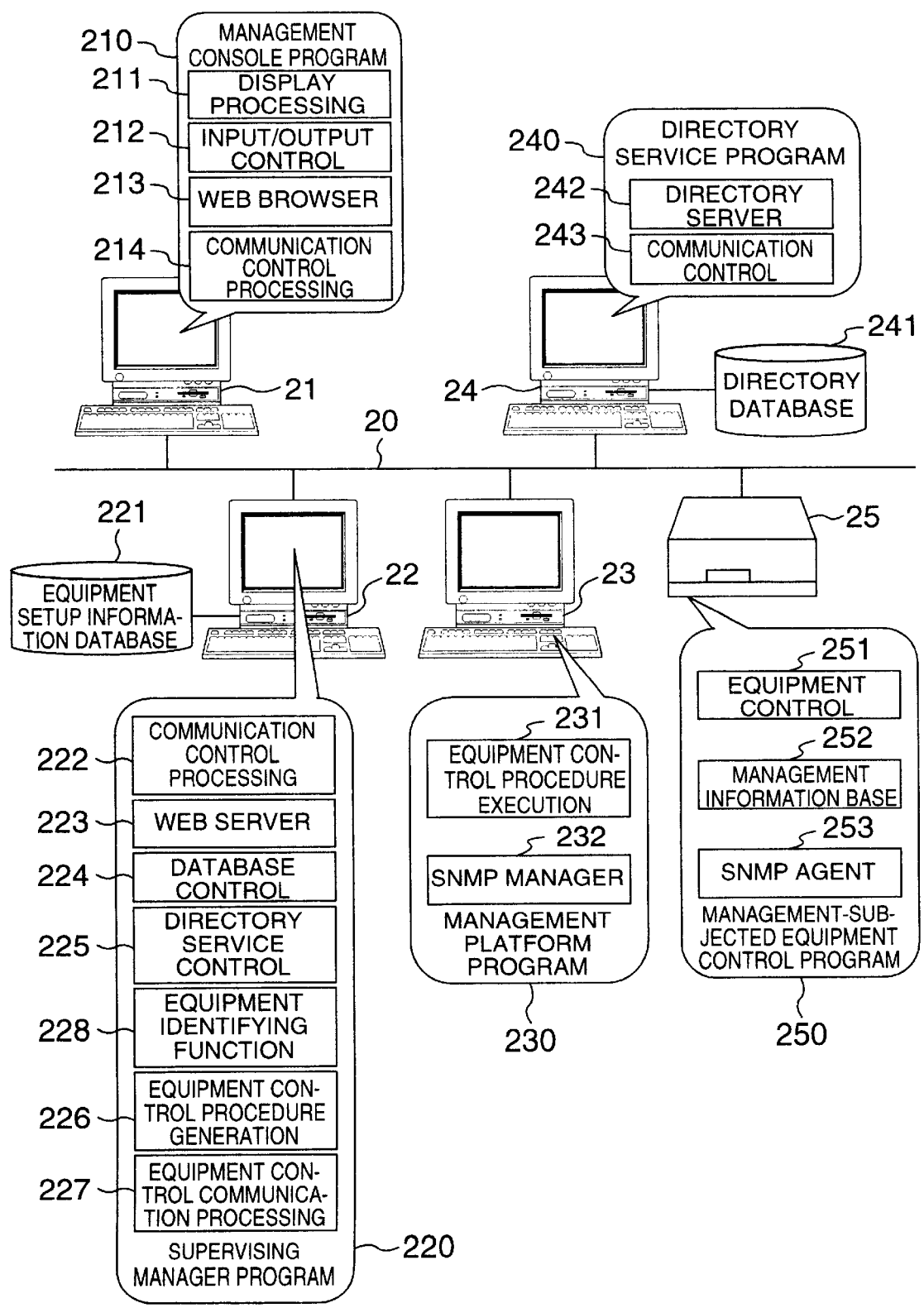
FIG. 1 is a view for illustrating in general an arrangement of a network management system according to an embodiment of the present invention.

At first, referring to FIG. 1, description will be directed to a system configuration in general of the network management system according to the instant embodiment of the invention.

Connected to a network 20 are a computer 21 serving as a management console (hereinafter referred to as the management console computer), a computer 22 serving as a supervising manager (hereinafter referred to as the supervising manager computer), a server computer 23 serving as a management platform (hereinafter referred to as the management platform computer) for providing equipment managing environment such as typified by SNMP (Simple Network Management Protocol), a computer 24 for directory services (hereinafter referred to as the directory server computer) and management-subjected equipment 25 which is subject to management.

As management console programs 210 which run on the management console computer 21, there can be mentioned such program modules as a display processing module 211, an input/output control module 212, a web browser module 213 and a communication control processing module 214. The display processing module 211 serves for realizing the function of displaying network implementation statuses to a network manager. The input/output control module 212 serves for realizing the function of allowing the network manager to input commands. The web browser module 213 serves for providing a standard environment for the management console. The communication control processing module 214 serves for the function for enabling dynamic information exchange between the management console computer 21 and the supervising manager computer 22. Incidentally, security function such as encrypted communication facility may be incorporated in the communication control processing module 214. Concerning the hardware structure of the management console computer 21, description will be made later on by reference to FIG. 2.

The display processing module 211, the input/output control module 212 and the communication control processing module 214 running on the management console computer 21 can be down-loaded from the supervising manager computer 22 as the program modules designed to run on the web browser module 213 of the management console computer 21 by making use of the function of the web browser module 213. In that case, the module required to be loaded in the management console computer 21 at the least may be only the web browser module 213.

At this juncture, it should be mentioned that by preparing the functions of the display processing module 211, etc., destined to run on the management console computer 21 by using a language which is not specific to any particular platform (i.e., language common to or universal to the platforms) such as worldwide standard language VRML (Virtual Reality Modeling Language), Java and the like, the display processing module 211 and others can be so implemented as to run on the web browser module 213 of given type through combination with HTML (Hyper Text Markup Language) or the like. Thus, the display processing module 211 and others can be so prepared as to run on the computers of large variety so long as the WWW (WorldWide Web) can be utilized. Furthermore, as the communication control processing module 214 capable of running on the management console computer 21, module conforming to other publicly known standards such as FTP (File Transfer Protocol) can be loaded or packaged.

As the supervising manager program 220 destined to run on the supervising manager computer 22, there can be mentioned such program modules as a communication control processing module 222, a web server module 223, a database control module 224, a directory service control module 225, an equipment control procedure generating module 226, an equipment control communication processing module 227 and an equipment discriminating or identifying function module 228. Further provided is an equipment setup information database (DB) 221 which is managed by the supervising manager computer 22.

The communication control processing module 222 is so designed as to allow dynamic information exchange with the management console computer 21. The web server module 223 serves for presenting static information display service to the management console computer in cooperation with the web browser module 213. The database control module 224 is designed for storing equipment setup data required for management in the equipment setup information database (DB) 221. The directory service control module 225 is so designed as to realize retrieval or search function for equipment management data, network user information, etc., by taking into account the structure of equipment and/or hierarchical structure of enterprise organization. The equipment control procedure generating module 226 serves for developing a setup altering procedure for the network equipment to an equipment setting sequence by making use of the equipment setup information database 221. The equipment control communication processing module 227 serves to send the equipment setting sequence information to the management platform computer 23. The equipment identifying function module 228 is designed to identify discriminatively network equipment. Incidentally, concerning the hardware structure of the supervising manager computer 22, description will be made later on by referring to FIG. 3.

As the management platform programs 230 which are destined to run on the management platform computer 23, there are provided an equipment control procedure execution module 231 and an SNMP (Simple Network Management Protocol) manager module 232. The equipment control procedure execution module 231 is so programmed as to control the execution of the equipment setting sequence sent from the supervising manager computer 22. On the other hand, the SNMP manager module 232 sends the information for management to the equipment to be set up (hereinafter referred to as the setup-destined equipment) in accordance with the SNM protocol.

In this conjunction, it should be mentioned that in the case where other equipment setup protocol than the SNMP is required, a corresponding manager designed for sending equipment setup information by using a relevant protocol may be disposed similarly to the SNMP manager module 232 to thereby support the relevant protocol. Incidentally, hardware structure of the management platform computer 23 will be described later on by reference to FIG. 4.

As the directory service programs 240 which run on the directory server computer 24, there can be mentioned such server program modules as typified by a directory server module 242 and a communication control module 243. A directory database (DB) 241 is managed by the directory server computer 24. The directory server module 242 is in charge of controlling the directory database 241. The communication control module 243 is designed to control the communication with the supervising manager computer 22.

Furthermore, as a management-subjected equipment control program 250 designed to run on the management-subjected equipment 25, there can be mentioned equipment control program modules such as an equipment control module 251, a management information base 252 and an SNMP (Simple Network Management Protocol) agent module 253.

The equipment control module 251 is programmed to realize the functions of the equipment itself. The management information base 252 is standardized for realizing the network management function through the medium of SNMP or the like. The SNMP agent module 253 performs send/receive processings involved in transferring information stored in the management information base 252 with the SNMP manager module 232.

Figure 2:
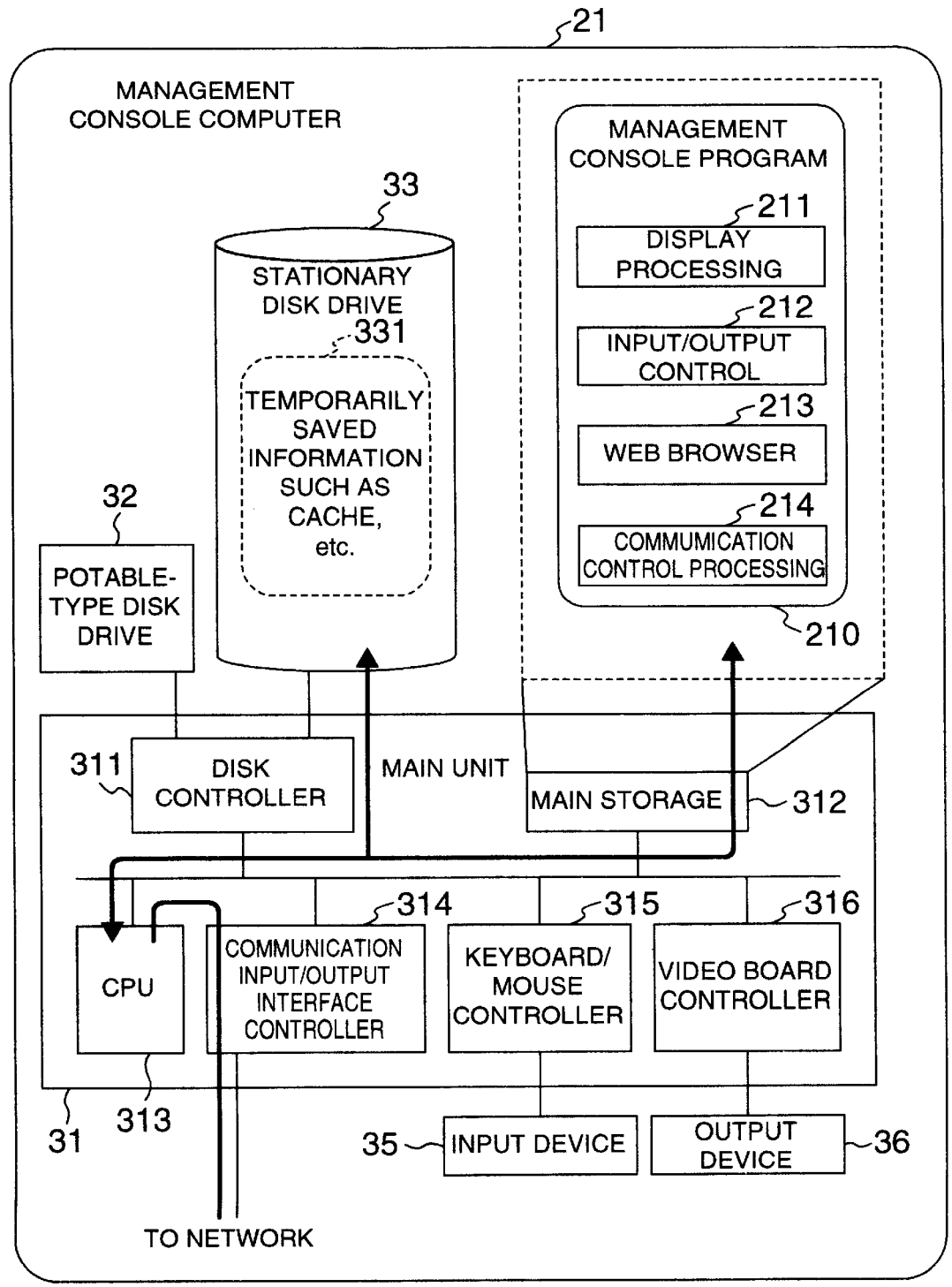
FIG. 2 is a block diagram showing schematically and generally a structure of a computer serving as a management console which can be employed in the network management system according to the invention.

Next, referring to FIG. 2, description will turn to the structure of the management console computer 21.

The management console computer 21 is realized in a structure similar to that of the conventional computer and is comprised of a main unit 31, a portable-type disk drive 32 such as a floppy disk drive or the like, a stationary disk storage 33, an input device 35 such as a keyboard and/or a mouse, and an output device 36 such as a display device. The main unit 31 in turn is comprised of a disk controller 311, a main storage 312, a central processing unit (or central arithmetic unit) 313, a communication input/output interface controller 314, a keyboard/mouse controller 315 and a video board controller 316.

The management console computer 21 responds to the input/output from/to the network 20 to thereby fetch the management console program 210 including the program modules 211, 212, 213 and 214 for the management console to store them in the main storage 312. When the stationary disk drive 33 is provided, it is utilized for the input/output of temporarily saved information 331 such as cache data, etc. In this conjunction, it should be mentioned that the management console program 210, the program modules 211, 212 and 214 except for the web browser module 213 can be delivered from the network 20, and thus the stationary disk storage 33 illustrated as being provided for the management console computer 21 is not always the indispensable component for the network management system according to the present invention.

Figure 3:
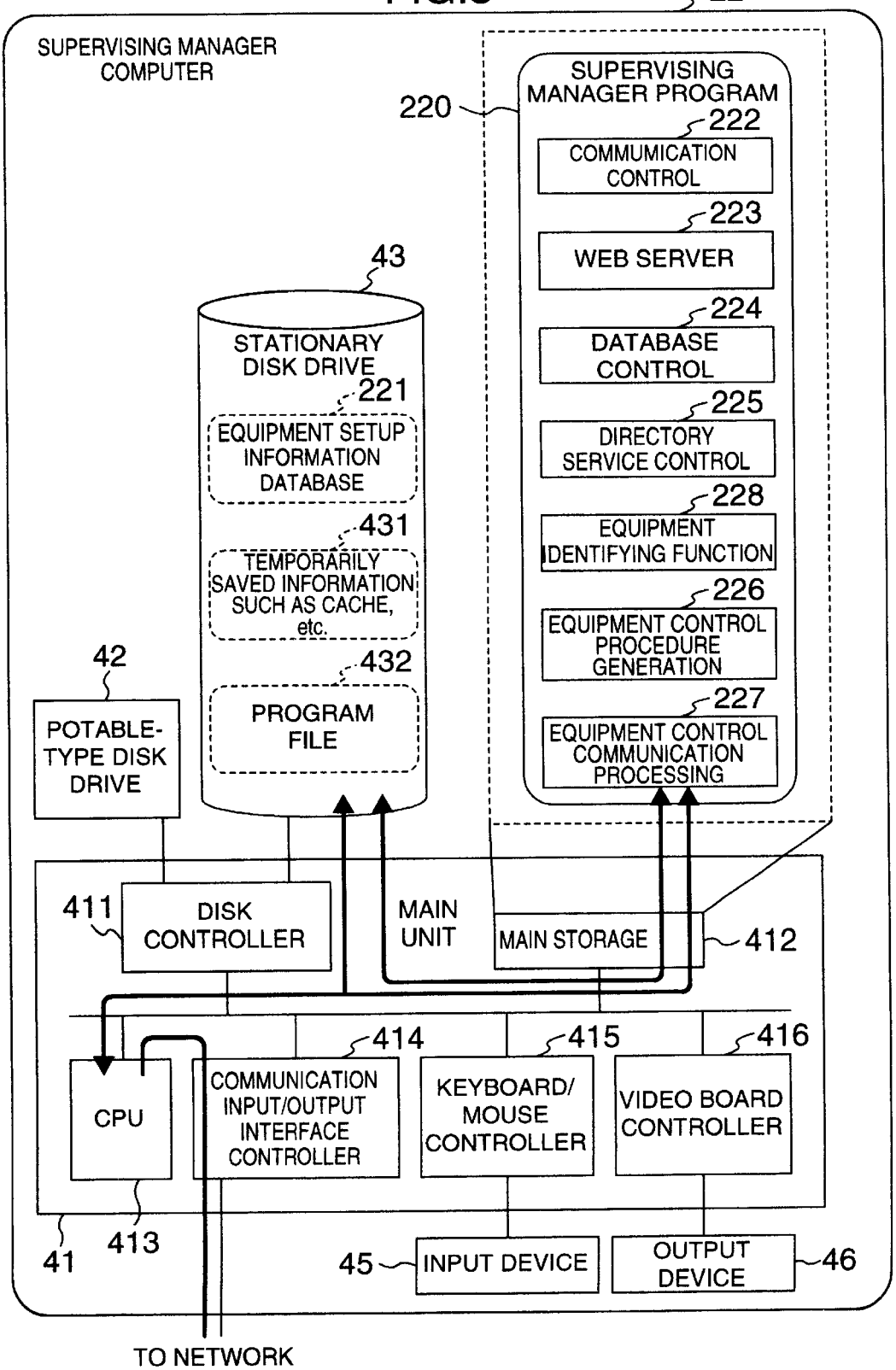
FIG. 3 is a block diagram showing schematically and generally a structure of a computer serving as a supervising manager which can be employed in the network management system according to the invention.

Next, referring to FIG. 3, description will be made of the structure or configuration of the supervising manager computer 22.

The supervising manager computer 22 is also realized in a structure similar to that of the conventional computer and comprised of a main unit 41, a portable-type disk drive 42 such as a floppy disk drive, a fixed or stationary disk drive 43, an input device 45 such as a keyboard and/or a mouse, and an output device 46 such as a display device. The stationary disk drive 43 stores therein the equipment setup information database 221, a temporarily saved information 431 such as cached data and a program file 432. The main unit 41 in turn is comprised of a disk controller 411, a main storage 412, a central processing unit (central arithmetic unit) 413, a communication input/output interface controller 414, a keyboard/mouse controller 415 and a video-board controller 416.

In the supervising manager computer 22, a group of the program modules for the supervising manager computer and a group of the program modules for the management console computer are held in the stationary disk drive 43 in the form of program files 432. The group of the program modules for the supervising manager computer 22 are executed on the main storage 412 of the supervising manager computer 22. In response to an activation request issued from the management console computer 21, the supervising manager computer 22 sends a group of the program modules 21 for the management console computer to the latter through the medium of the communication input/output interface controller 414. Further, send/receive requests issued on a real time basis are processed in response to user's operation or manipulation for the supervising manager computer 22.

Further, the supervising manager computer 22 performs communication with the management platform computer 23 for acquisition and supply of the network equipment setup information. This communication is also performed through the medium of the communication input/output interface controller 414 by way of the network 20 similarly to the communication with the management console computer 21. Incidentally, the supervising manager computer 22 and the management platform computer 23 need not always be provided independently. The functions of these computers 22 and 23 may be realized by using one and the same computer hardware. In that case, the data transfer mentioned above can be realized through a data bus provided internally of the computer mentioned just above without need for intervention of the network.

Figure 4:
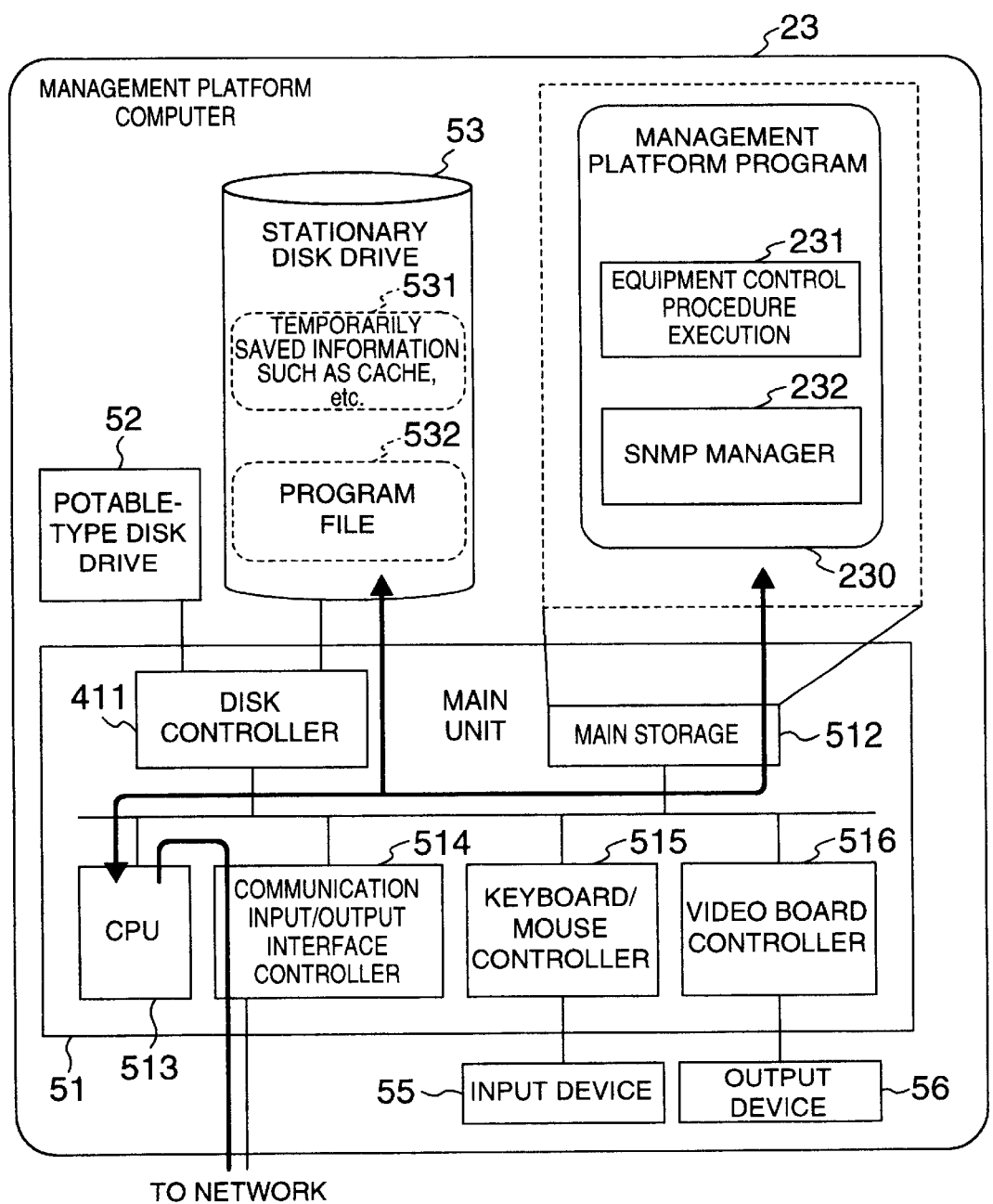
FIG. 4 is a block diagram showing schematically and generally a structure of a computer serving as a management platform which can be employed in the network management system according to the invention.

Next, referring to FIG. 4, description will be made of the structure of the management platform computer 23.

The management platform computer 23 is also realized in a structure of the conventional computer and comprised of a main unit 51, a portable-type disk drive 52 such as a floppy disk drive, a fixed or stationary disk drive 53, an input device 55 such as a keyboard and/or a mouse, and an output device 56 such as a display device. The stationary disk drive 53 stores therein a temporarily saved information 531 such as cached data and a program file 532. On the other hand, the main unit 51 is comprised of a disk controller 511, a main storage 512, a central processing unit 513, a communication input/output interface controller 514, a keyboard/mouse controller 515 and a video-board controller 516.

Figure 5:
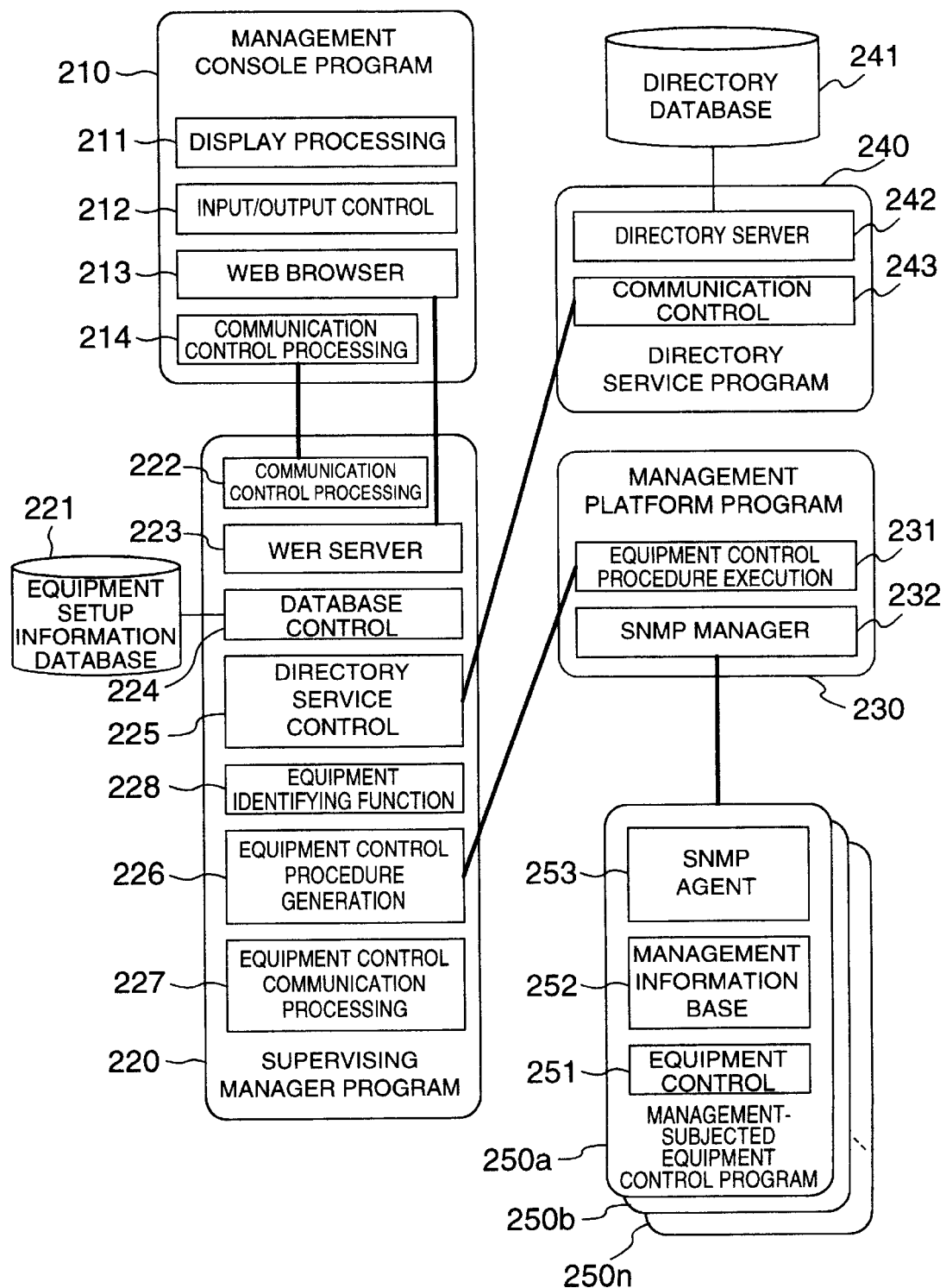
FIG. 5 is a view for illustrating communication channels formed or established among individual program modules in the network management system according to the invention.

Now, referring to FIG. 5, description will be made of communication channels formed for the communications performed among the individual program modules of the management console program 210, the supervising manager program 220, the management platform program 230, the directory service program 240 and the management-subjected equipment control program 250 illustrated in FIG. 1.

The communication channel established or secured between the management console program 210 and the supervising manager program 220 includes a communication channel secured between the web server module 223 and the web browser module 213 for transmission of programs, and a communication channel established between the communication control processing modules 214 and 222 in response to a data send/receive request issued on a real time basis upon activation of the program. As the protocol for these communications, a conventional communication protocol such as "HTTP (Hyper Text Transfer Protocol)" or "Socket" can be used.

Further secured or established between the supervising manager program 220 and the directory service program 240, more specifically, between the directory service control module 225 and the communication control module 243 is a communication channel for enabling search and update processing for the directory database 241. In that case, as the communication protocol to this end, there may be employed a standard protocol such as DAP (Directory Access Protocol) or LDAP (Lightweight Directory Access Protocol).

Furthermore, for allowing the supervising manager program 220 to acquire information from the network equipment and execute setup operation, another communication channel is established between the supervising manager program 220 and the management platform program 230, more specifically, between the equipment control procedure generating module 226 and the equipment control procedure execution module 231. As the communication protocol to this end, there can be employed a transfer protocol such as "ftb" and a data exchange protocol such as a data stream processing communication protocol. Besides, in the case where the management platform program 230 and the supervising manager program 220 are designed to run on the same computer hardware, an inter-process communication mechanism such as a pipe can be employed alternatively as the communication channel.

Additionally, communication channels are secured between the SNMP manager module 232 of the management platform program 230 and individual SNMP agents 253 of management-subjected equipment control programs 250a, 250b, . . . , and 250n, respectively.

Next, referring to FIG. 6, description will be made in detail of a structure of the management console program 210. Parenthetically, in this figure, reference numerals same or components as those used in FIG. 1 designate, respectively, like parts as those shown in FIG. 1.

The management console program 210 is constituted by the display processing module 211, the input/output control module 212, the web browser module 213 and the communication control processing module 214, as shown in FIG. 1. The management console program 210 can be functionally classified globally into three types of application modules in dependence on the contents to be displayed on the output device 36 (FIG. 2) which serves as a user interface for the management console computer 21. They are a menu module 2101, a two-dimensional tree view module 2102 and a three-dimensional tree view module 2103.

As the component modules for realizing the display processing module 211, there can be mentioned a menu control processing module 2111 which is implemented with a web-destined script language such as HTML (Hyper Text Markup Language), Java Script or the like, a two-dimensional tree control processing module 2112 implemented with a web-destined program language and a three-dimensional view control processing module 2113 implemented with a script language for the three-dimensional display such as VRML (Virtual Reality Modeling Language) or the like.

As the component modules for realizing the input/output control module 212, there can be mentioned an input control module 2121 for controlling inputs from the menu as displayed, a two-dimensional database control module 2122 for requesting the supervising manager for input/output of data for the two-dimensional display, a two-dimensional/three-dimensional communication processing module 2123 for performing communication control for interlocking operations of the two-dimensional display and the three-dimensional display, a three-dimensional database control module 2124 for requesting the supervisory manager for input/output of data for the three-dimensional display, and an action library module 2125 for altering contents of the three-dimensional display in accordance with the commands inputted by the user.

As the constituent modules required for the web browser module 213, there can be mentioned a virtual machine module 2131 for executing a web-destined program on the web browser and a VRML (Virtual Reality Modeling Language) plug-in module 2132 designed for executing actual display processing by processing the script language for the three-dimensional display.

Furthermore, as the constituent modules for realizing the communication control processing module 214, there can be mentioned an equipment setting module 2141 for enabling to manipulate directly the function of the management platform from the menu, a two-dimensional database (DB) access module 2142 for actually transferring to the supervisory manager a request issued by the two-dimensional database control module 2122 to thereby acquire the result thereof, and a three-dimensional database access module 2143 for actually transferring to the supervisory manager a request issued by the three-dimensional database control module 2124 to thereby acquire the result thereof.

Figure 7:
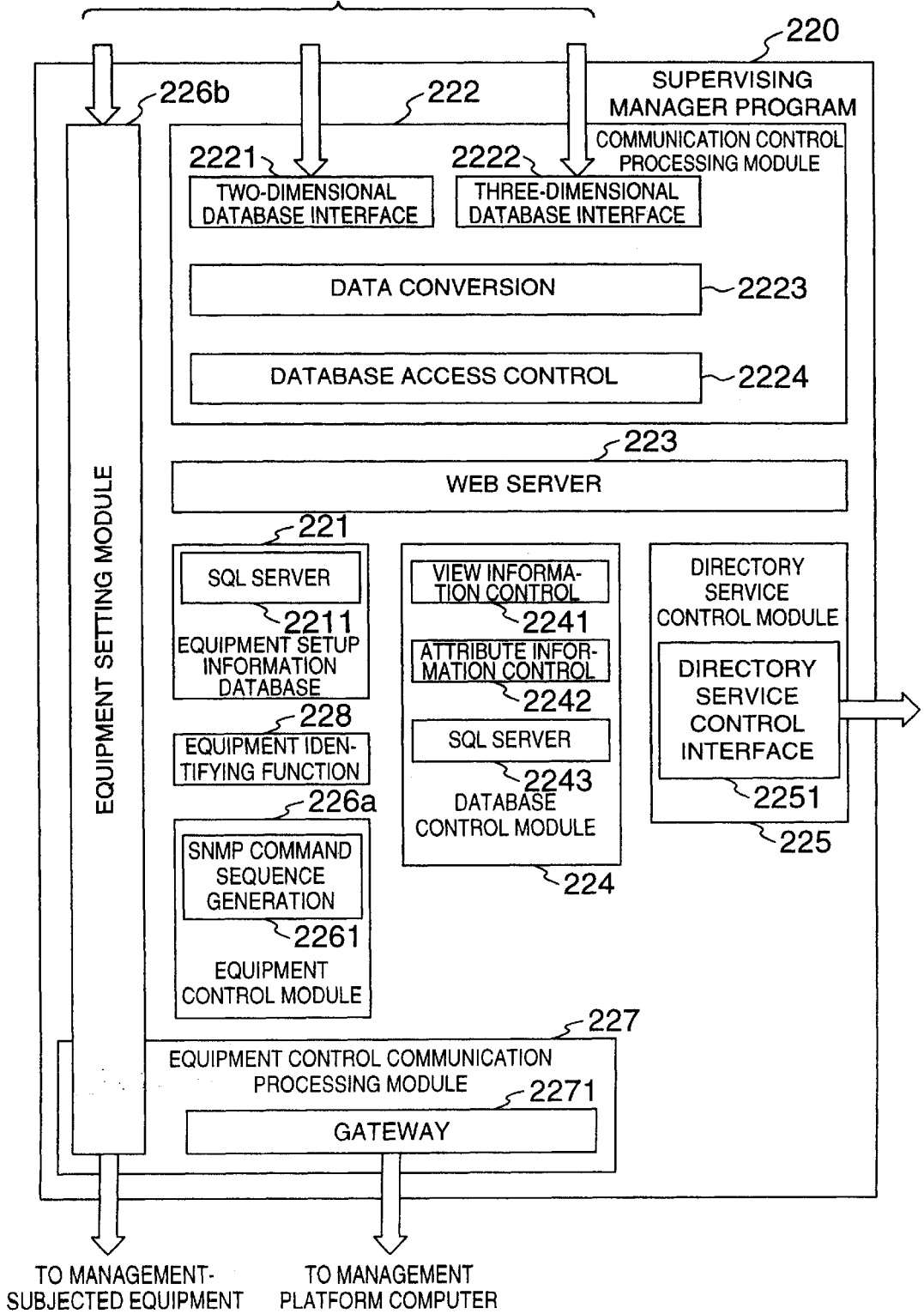
FIG. 7 is a block diagram illustrating a structure of a supervising manager program which can be employed in the supervising manager computer according to the invention.

Next, referring to FIG. 7, description will be made in detail of a structure of the supervising manager program 220. In the figure, like reference numerals as those used in FIG. 1 denote components like as or equivalent to those shown in FIG. 1.

The supervising manager program 220 is constituted by such program modules as the communication control processing module 222, the web server module 223, the database control module 224, the directory service control module 225, the equipment control procedure generating module 226, the equipment control communication processing module 227 and the equipment identifying function module 228, as described hereinbefore by reference to FIG. 1. The equipment control procedure generating module 226 in turn is comprised of an equipment control module 226a and an equipment setting module 226b for relaying or repeating to the management platform the information which is required for directly manipulating the management platform computer 23 from the management console computer 21.

Figure 6:
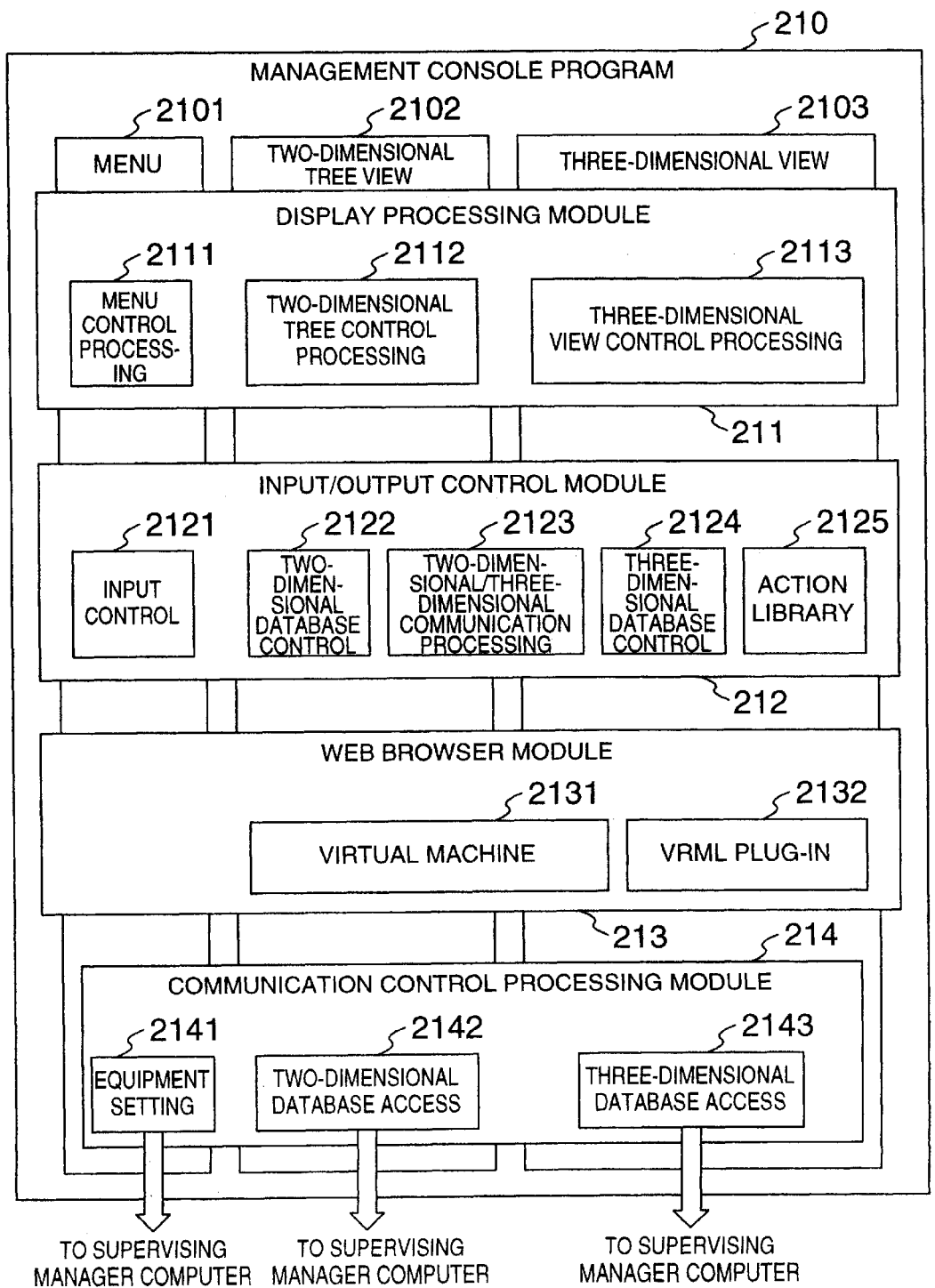
FIG. 6 is a block diagram illustrating a structure of a management console program which can be employed in the management console computer according to the invention.

As the constituent or component modules for implementing the equipment communication control processing module 222, there are provided for performing communication processing with the display processing module 211 of the management console computer 21 a two-dimensional database interface module 2221 for receiving commands inputted from the two-dimensional database access module 2142 shown in FIG. 6, a three-dimensional database interface module 2222 for receiving commands inputted from the three-dimensional database access module 2143, a data conversion module 2223 for converting various types of information supplied from the equipment setup information database 221 and the directory service program 240 into a format suited for data interfacing with the management console program 210, and a database access control module 2224 for performing a processing of distributing the various database access requests to the pertinent database control modules for the equipment setup information database 221, the directory database 241 and the like.

As the component module for implementing the equipment setup information database 221, there is required a database function such as an SQL (Structured Query Language) server 2211 or the like.

Similarly, for realizing the database control module 224, there are required a database function such as a view information control module 2241 stored as the data common to the two-dimensional display and the three-dimensional display, an attribute information control module 2242 for controlling the detail attribute information of the management-subjected equipment, and an SQL (Structured Query Language) server 2243 designed for database control.

As the component modules for implementing the directory service control module 225, there are required a directory service control interface module 2251 such as LDAP (Lightweight Directory Access Protocol), API (Application Program Interface) or the like for issuing a request for data search/update or the like to the directory service.

Further, as another component module for implementing the equipment control procedure generating module 226, there is required an SNMP command sequence generating module 2261 for generating an equipment control sequence in the form of a string of commands conforming to SNMP (Simple Network Management Protocol) representative of the equipment control protocol, to thereby supply the control sequence to the management platform computer 23. Besides, there may be prepared a similar command sequence generating module for realizing or packaging the function for collecting information from the equipment having no SNMP interface and/or for the setup thereof.

As the equipment control communication processing module 227, there may be mentioned a gateway function 2271 to the management platform.

Figure 8:
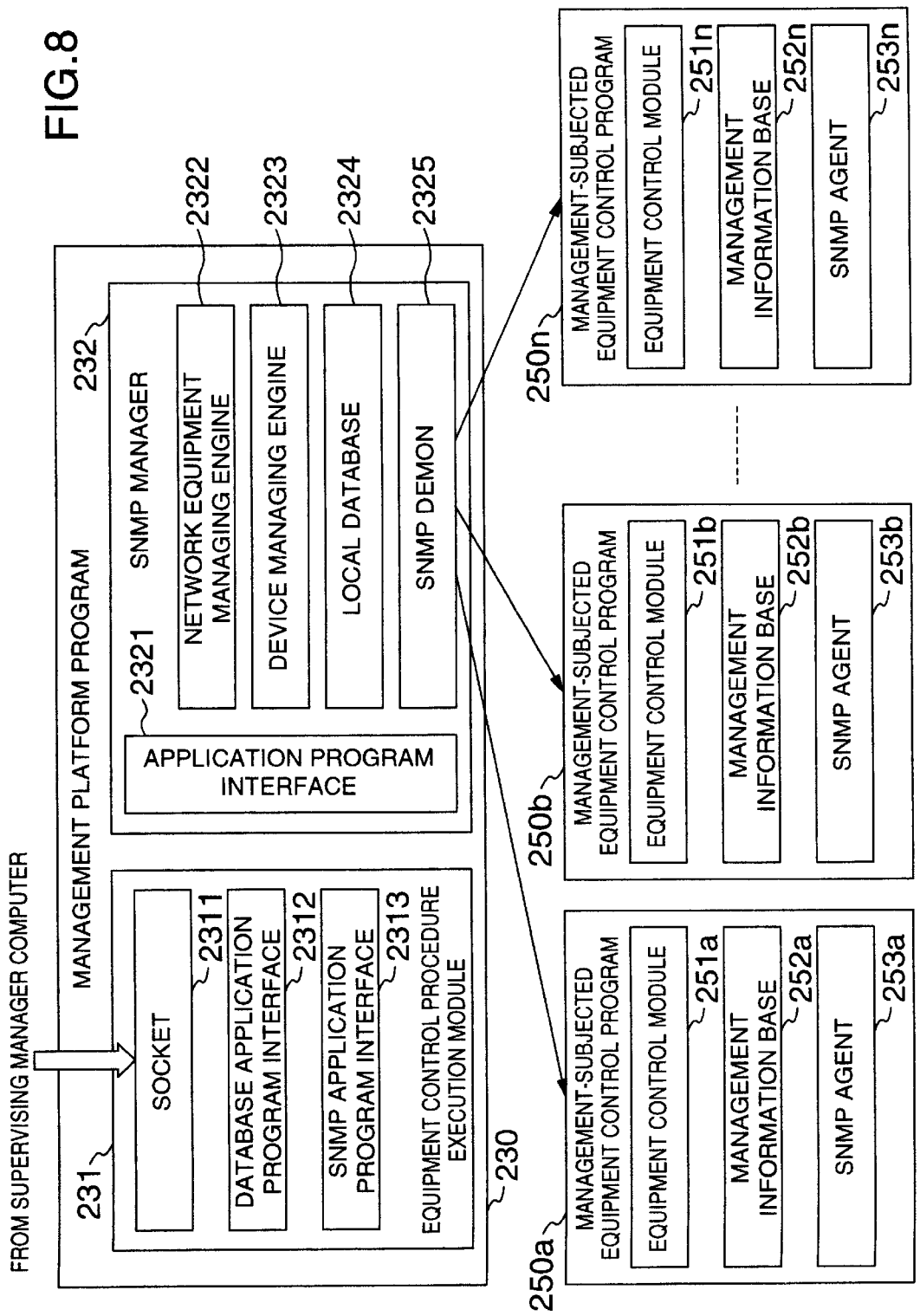
FIG. 8 is a block diagram illustrating a structure of a management platform program which can be employed in the management platform computer according to the invention.

Next, referring to FIG. 8, description will be made in detail of a structure of the management platform program 230. In the figure, like reference numerals as those used in FIG. 1 denote components like as or equivalent to those shown in FIG. 1.

The management platform program 230 includes the equipment control procedure execution module 231 and the SNMP manager module 232, as can be seen in FIG. 1.

As the component modules for realizing the equipment control procedure execution module 231, there are provided a socket 2311 for receiving communication from the supervising manager computer 22, a database application program interface 2312 for manipulating a local database of the management platform computer 23, and an SNMP application program interface 2313 for enabling manipulation of the SNMP manager 232.

The SNMP manager 232 has be to equipped with an application program interface function for using an application program interface 2321 when the manager function is employed. Additionally, as other components of the SNMP manager module 232, there are provided a network equipment managing engine 2322, a device managing engine 2323, a local database 2324 for networks object and an SNMP demon 2325 for generating SNMP packets.

The management-subjected equipment control programs 250a, 250b, . . . and 250n are constituted by the equipment control modules 251a, 251b, . . . and 251n, the management information bases 252a, 252b, . . . and 252n, and the SNMP agents 253a, 253b, . . . and 253n, respectively.

Figure 9:
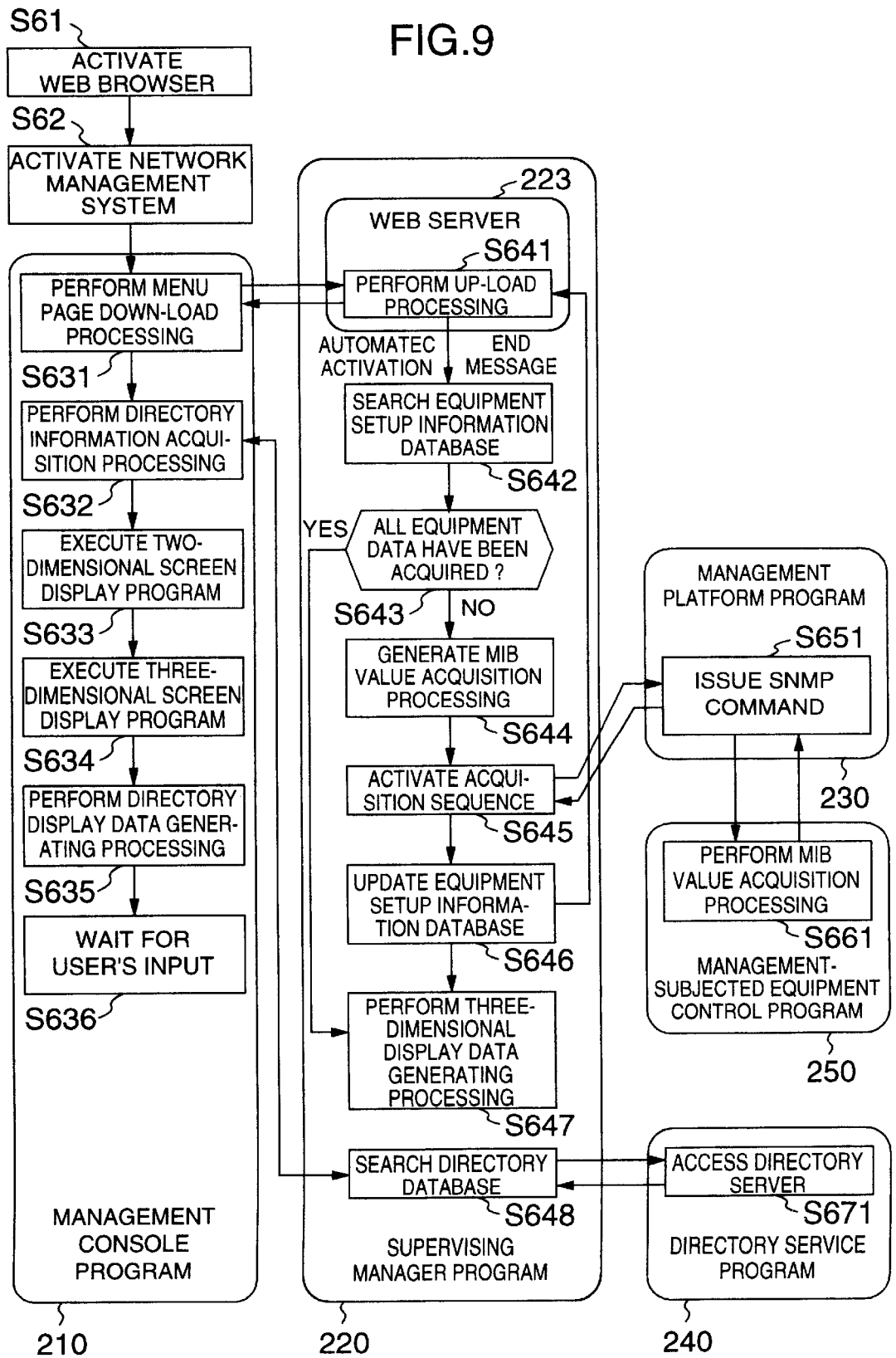
FIG. 9 is a flow chart for illustrating a flow of processings involved in collecting information concerning network equipment up to display thereof in the network management system according to the invention.

Next, by referring to FIG. 9, description will be directed to a flow of processings involved in starting or activating of the network management system according to the instant embodiment of the invention, collecting the information concerning the individual network equipment and displaying the network configuration information in the management console computer. In the figure, like reference numerals as those used in FIG. 1 denote components like as or equivalent to those shown in FIG. 1.

Referring to FIG. 9, in the network management system according to the present invention, the web browser module 213 of the management console program 210 is activated in a step S61.

In succession, the network management system is activated in a step S62.

In response to the activate processing of the web browser module 213 in the step S61 and the activate processing of the network management system in the step S62, the activation processings mentioned below are executed.

In a step S631, the management console program 210 executes download processing of the menu page, while the supervising manager program 220 executes upload processing in a step S641. Then, the menu page is called through communication between the web server 223 of the supervising manager program 220 and the web browser 213 of the management console program 210.

Subsequently, in a step S642, the supervising manager program 220 executes a processing for searching or retrieving the setup information of the individual network equipment from the equipment setup information database 221.

At that time, the supervising manager program 220 decides in a step S643 whether or not the setup information of all the equipment has been acquired while confirming the existence of the equipment on the network. When it is decided that the setup information of all the equipment on the network has been acquired, the processing proceeds to a step S647.

By contrast, when it is decided that the setup information of all the equipment has not been acquired yet, the supervising manager program 220 generates a sequence for acquiring the equipment setup information (MIB values (Management Information Base values)) in a step S644.

In succession, the supervising manager program 220 requests the management platform program 230 to execute the setup information acquisition processing in a step S645.

The management platform program 230 issues the SNMP command to the management-subjected equipment control programs 250, respectively, in response to the request for the setup information acquisition processing issued by the supervising manager program 220 in a step S651.

Each of the management-subjected equipment control programs 250 executes the equipment setup information (MIB value) acquisition processing in response to the SNMP command from the management platform program 230 in a step S661. The equipment setup information (MIB value) as acquired is then sent through the medium of the management platform program 230 to the supervising manager program 220, which receives the information through the processing in the step S645.

Next, in a step S646, the supervising manager program 220 executes a processing for updating the equipment setup information database on the basis of the equipment setup information as received. The updated equipment setup information is sent back to the web server module 223 to be received by the management console program 210 through the upload processing in the step S641 and the download processing in the step S631.

Furthermore, in a step S647, the supervising manager program 220 executes a processing for generating three-dimensional display data.

Hereat, referring to FIG. 10, description will be made of the concept of storing or packaging to network setup information in the object-oriented database in the network management system according to the instant embodiment of the invention.

Individual objects appearing in a directory tree structure view 81 representing an organization are packaged or stored in the directory database 241, while individual objects in a tree structure view 82 representing a structure or configuration of the virtual network are packaged in the equipment setup information database 221, wherein correlations are established to individual equipment setup information 83 (831*a*, . . . , and 831*k*), respectively, which correspond to the individual equipment and the functions thereof determined through the equipment control procedure execution module 231 of the management platform computer 23.

Figure 10:
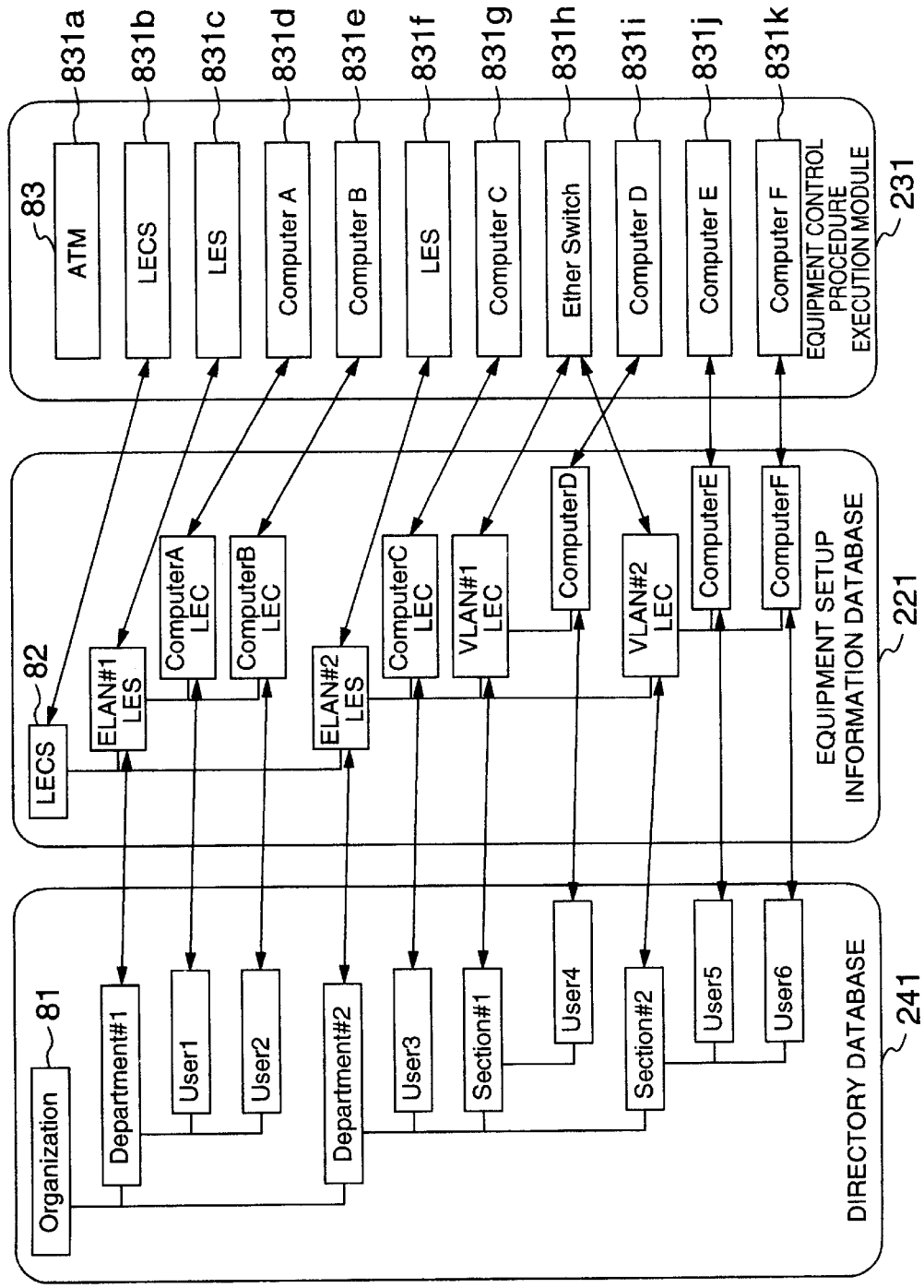
FIG. 10 is a conceptual view for illustrating storing or packaging of network setup information in an object-oriented database in the network management system according to the invention.

In the case of the example illustrated in FIG. 10, two objects "Department #1" and "Department #2" bear correspondences to two virtual segments of LAN emulations "ELAN #1" and "ELAN #2", respectively, while two sections "Section #1" and "Section #2" correspond to two virtual segments "VLAN #1" and "VLAN #2", respectively. At this juncture, it should be mentioned that in the case where the correspondence relations lack consistency, it is possible to indicate the correspondence relations by arrows.

Furthermore, relations between the users and the individual LEC objects are defined. When the user occupies exclusively one LEC, the correspondence relation with the object is indicated by one-to-one correspondence relation. On the other hand, when a plurality of users use one LEC, the correspondence relation is indicated by a "plural-to-one" correspondence relation. Similarly, in the case where one user is using a plurality of LECs, the relation can be given by "one-to-plural" correspondence relation.

The objects 831*a*, . . . and 831*k* represent object data of the equipment displayed on the physical network, respectively, and are related to the individual objects on the virtual network.

Thus, when the setup status of an object on the virtual network is to be altered, the relevant equipment for which manipulation should be performed can easily be identified. Besides, when the department to which a user belongs is to be changed, it can be easily determined how to alter or change the configuration of the virtual network or for which of the equipment the alteration of the network configuration is to be performed.

Figure 11:
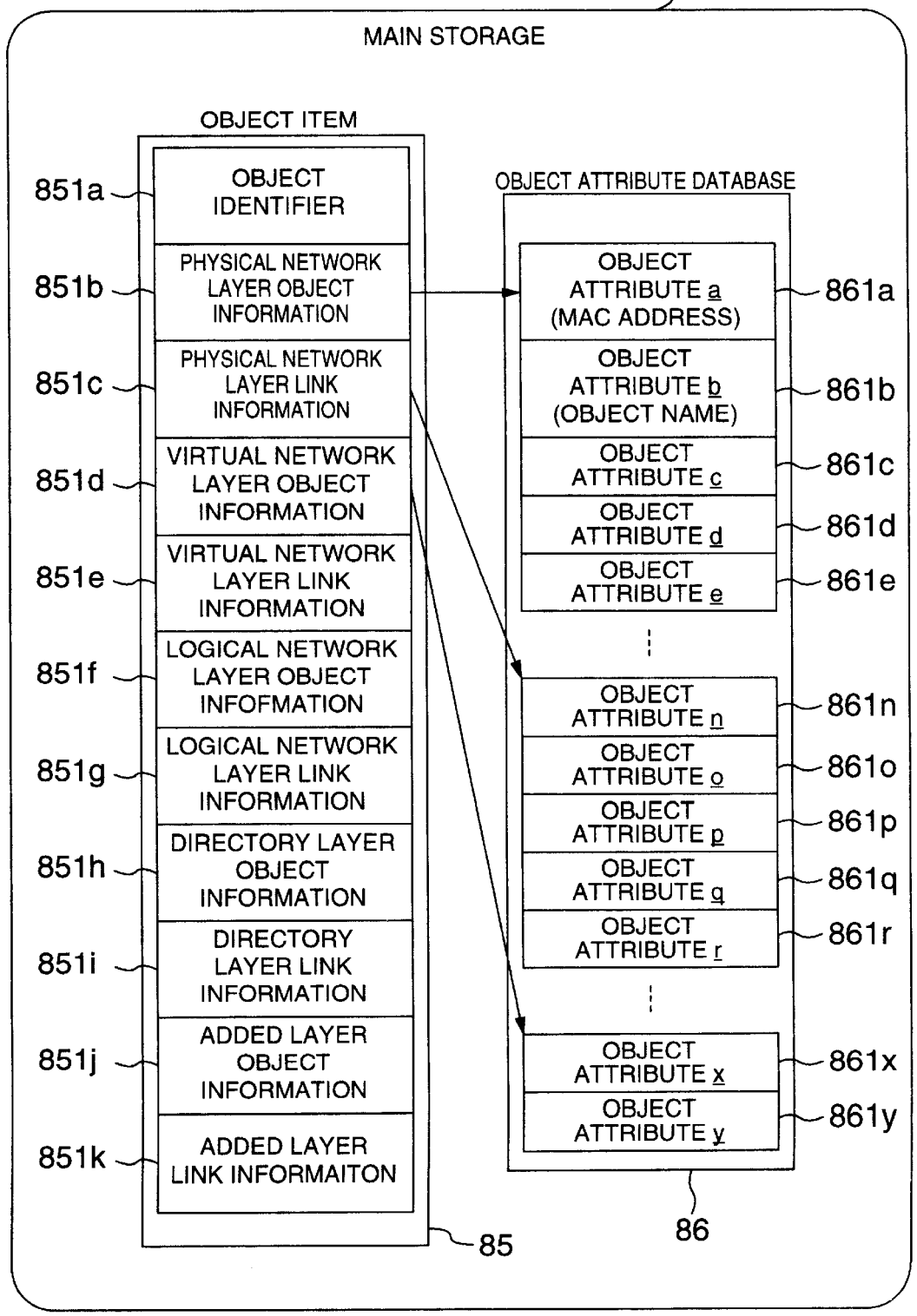
FIG. 11 is a view for illustrating a data structure adopted for handling object data on a plurality of network structure views which are handled by the network management system according to the invention.

Next, referring to FIG. 11, description will be directed to an exemplary or typical data structure for handling the object data on a plurality of network structure views handled by the network management system according to the instant embodiment of the invention.

Object items 85 and object attributes 86 are stored as parts of the main storage 412 of the supervising manager computer 22, wherein the object items 85 represents the data of one object displayed on a given one of the network layers.

An object identifier 851*a* is composed of an ID (identifier) of the network layer to which the relevant object belongs and an ID of the object on that network layer.

Individual information such as object information 851*b* of the physical network layer, link information 851*c* for the physical network layers, object information 851*d* of the virtual network layer, link information 851*e* for the virtual network layers, object information 851*f* of the logical network layer, link information 851*g* for the logical network layers, object information 851*h* of the directory layer, link information 851*i* for the directory layers, object information 851*j* of added layer and link information 851*k* for the added layer are stored as pointers at respective relevant areas of the main storage 412 storing actually the data of the object attribute database 86 to be used as the association information (relation establishing information) for the other objects in the same network or objects on the other network layers.

By way of example, in order to know in what fashion a given object is shown on the physical network layer, then the physical network layer object information 851*b* may be referenced to make access to the area where the attribute information of that object is stored. Thus, the information of concern can be obtained.

Furthermore, in order to know what kind of relation or association the above-mentioned object bears to other object on the physical network, then the physical network layer link information 851*c* may be referenced to make access to the area where the object attribute information is stored, to thereby acquire the information of concern.

By adding the object association information such as mentioned above, information concerning services or the like on the other networks can also be added easily although not described concretely herein.

Next, referring to FIG. 12, description will be made of a structure of an address management table employed in the environment in which address allocation is performed dynamically in the network management system according to the instant embodiment of the invention.

The address management table 50 for managing the IP address allocation status contains a list of addresses 501 of the IPs which are to be managed with this table as the subjects for the address allocation, information concerning active/reserved/unoccupied statuses of the IP addresses, as designated by reference numeral 502, and information concerning MAC addresses allocated to network ports of the machines or equipment to which the IP addresses have been allocated, as designated by reference numeral 503. The address management table 50 is stored in the main storage 412 incorporated in the supervising manager computer 22.

The active/reserved/unoccupied statuses 502 of the IP addresses can be indicated by the respective records 541*a* 541*b*, . . . and 541*z*. By way of example, the IP address "192.168.11.0" of the record 541*a* is allocated with the MAC address "00:00:00:22:11:42" at the port, indicating that the corresponding IP address is currently in the reserved state, which in turn means that the relevant IP address is not currently being used. The IP address "192.168.11.2" is allocated with the MAC address "00:00:00:23:11:55" and is in the active state, i.e., "used or occupied states". Needless to say, similar management can be performed on the other logical addresses than the IP addresses.

In this manner, with the dynamic logical address allocation facility described above, it is possible to manage the address allocation status on a real-time basis.

Now, turning back to FIG. 9, processings executed by the management console program 210 in succession to the step S632 will be described.

In a step S632 in FIG. 9, the management console program 210 executes the directory information acquisition processing for the supervising manager program 220.

In a step S648, the supervising manager program 220 responds to a directory information acquisition request issued by the management console program 210 to thereby issue a request for search of the directory database 241.

In a step S671, the directory service program 240 makes access to the directory server module 242 in response to the above-mentioned search request to thereby acquire the directory information which is then transferred to the supervising manager program 220.

On the other hand, the supervising manager program 220 transfers the received directory information to the management console program 210 through the processing in a step S648.

Thus, the management console program 210 acquires the directory information through the processing in the step S632.

Figure 13:
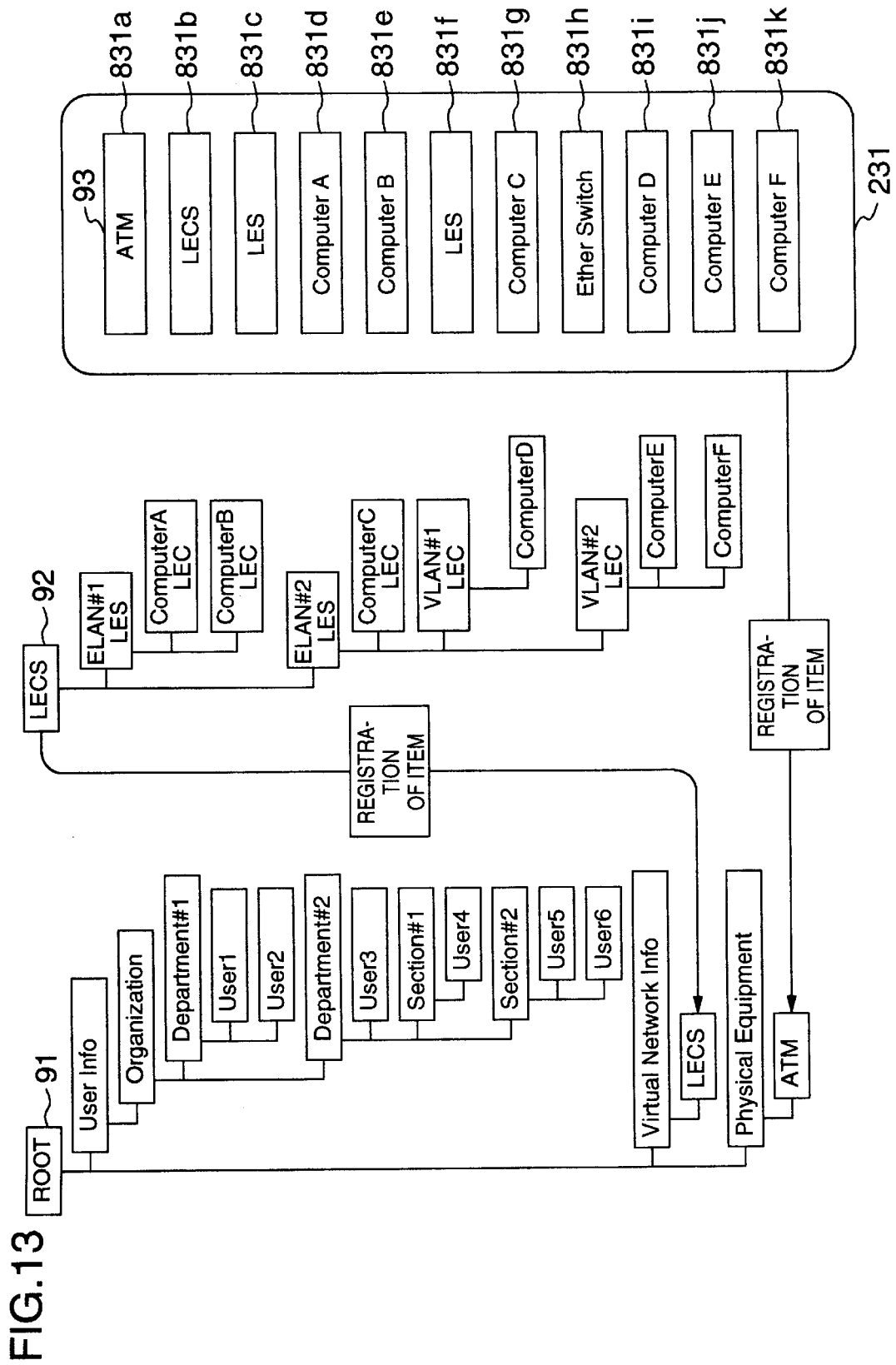
FIG. 13 is a view for illustrating a method or procedure for handling in a consolidated manner the network setup information in the network management system according to the invention.

At this juncture, referring to FIG. 13, description will be made of a registration method which allows the network setup information packaged in the object-oriented database shown in FIG. 10 to be handled on the directory database 241 in a consolidated manner.

As described hereinbefore by reference to FIG. 10, the data 91, 92 and 93 hierarchized on a group basis are registered in the directory database 241, respectively, at locations determined with reference to other object of a same level in each of the groups. More specifically, of the data 91, the user related information "User Info.", and the logical network structure information of the virtual network "Virtual Network Info." and the physical connection information of the equipment and the network "physical Equipment" are registered in a same hierarchical layer.

The directory "User Info.", for the user-related information has a tree structure in which "Organization" is located at hierarchically lower layer with "Department #1" and "Department #2" being located hierarchically at lower layer than "User Info.". As to the logical network structure information "Virtual Network Info.", data 92 of tree structure is registered in "Virtual Network Info." of the data 91, whereby such a tree structure is realized in which "LECS" is disposed at a hierarchically lower layer of "Virtual Network Info." of the data 91 with "ELAN #1" and "ELAN #2" being located at hierarchically lower layer than "LECS". Similarly, in the physical connection information "Physical Equipment", data 93 is registered in data 91 "Physical Equipment", wherein information "ATM", "LECS", "LES", etc., are located at hierarchically lower level than the data 91 "Physical Equipment".

By virtue of the registration such as described above, the setup information of the individual equipment, the information of the virtual network structure or configuration and the user management information can be handled as the same type directory service data, and at the same time the relations or associations between the users and the equipment can easily be packaged in association with the individual object data on the directory service.

Furthermore, owing to the availability of the inter-object access control list and the authentication function, manipulation as well as method for allowing the user to make access to the individual equipment can easily be defined. In this conjunction, it should also be mentioned that by defining the authentication functions for the equipment and the virtual networks similarly to the authentication of the users, the network management system of significantly high reliability can be realized while assuring very high security.

Figure 14:
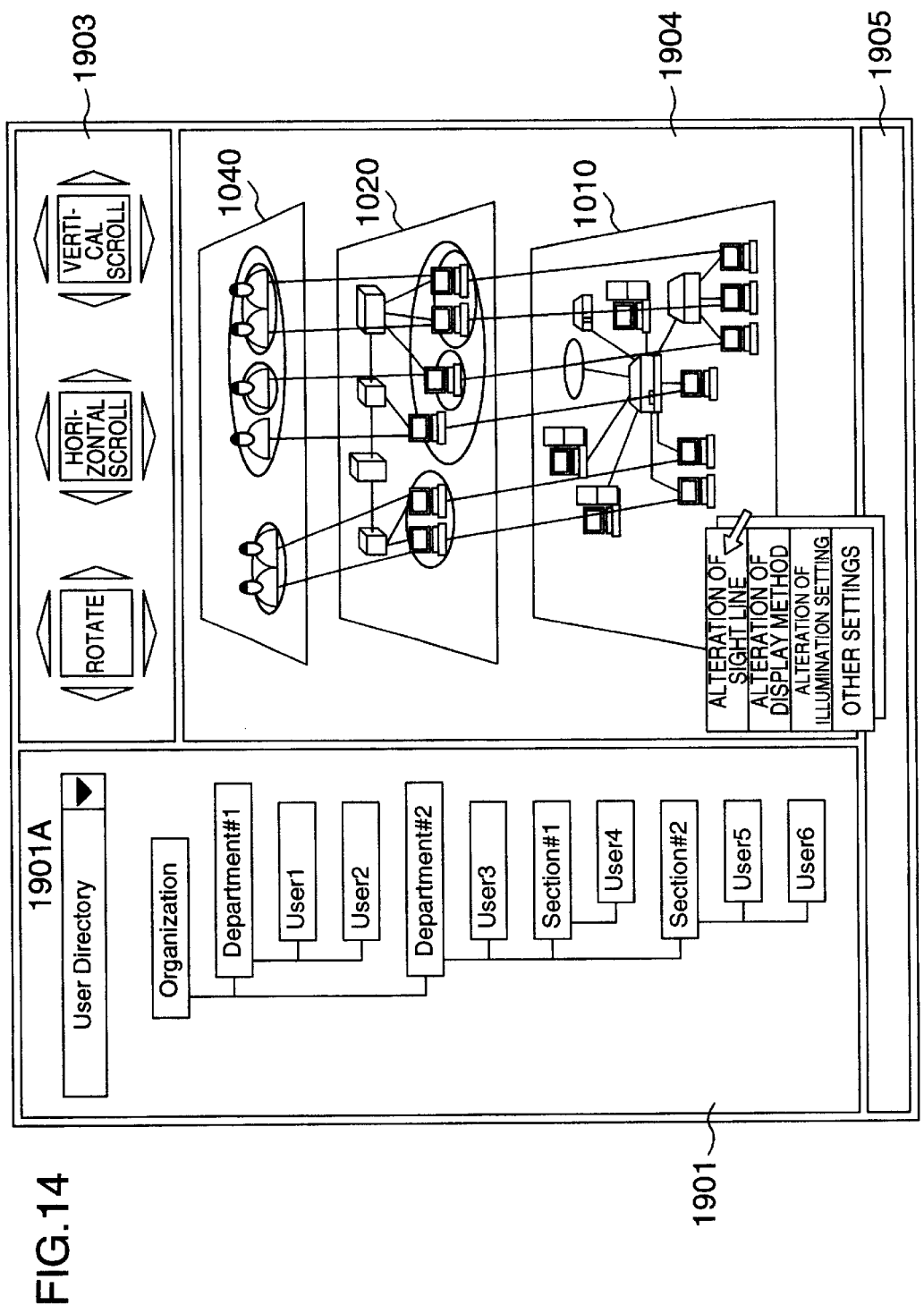
FIG. 14 is a view for illustrating an example of display generated on a screen of a display device of the management console computer in the system according to the invention.

Now, referring to FIG. 14, description will be made of an example of display generated on a screen of a display device of the management console computer 21 according to the invention.

The screen of the display device which serves as the output device 36 of the management console computer 21 may be composed of display areas 1901, 1904 and 1905, a control area or field 1903 and others. In the display area 1901 located at a left-hand side of the display screen, the data acquired or read out from the directory database 241 are displayed in a tree structure. In the case of the illustrated example, the user-related information "User Info." contained in the data 91 described hereinbefore by reference to FIG. 14 is displayed in the area 1901. Incidentally, by displaying the menu by clicking a button 1901A, it is possible to display equally the logical network configuration information "Virtual Network Info." or the physical connection information "Physical Equipment" in place of the user-related information "User Info.".

In the display area 1904, a three-dimensional display is generated. The three-dimensional display is composed of a user's display plane 1040 for displaying the user-related information, a virtual network display plane 1020 for displaying the logical network configuration information and a physical network display plane 1010 for displaying the physical connection information, details of which will be described later on by reference to FIG. 16. By generating the three-dimensional display in this manner, the information of the users as well as the network information can be displayed very effectively. In this conjunction, it should however be added that although the three-dimensional image is displayed in the case of the example illustrated in FIG. 14, the two-dimensional image generated through the processing in the step S633 shown in FIG. 9 can equally be displayed by changing the display method correspondingly.

The control field 1903 is provided for allowing the sight line for the display area 1904 displayed three-dimensionally. The display area 1905 serves as a status display area for displaying the menu of items for manipulation and the current statuses.

Figure 15:
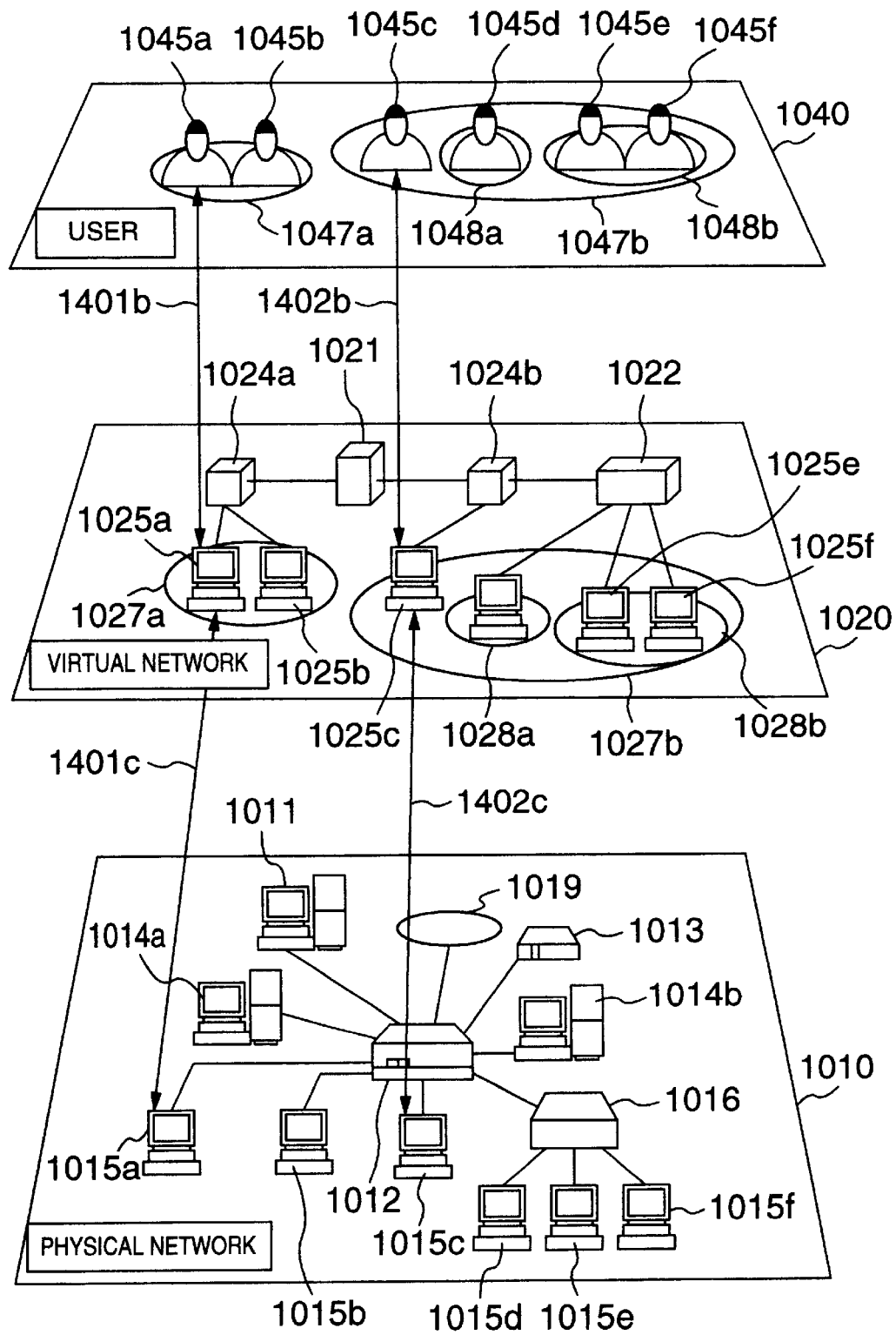
FIG. 15 is a view showing a plurality of network configuration or structure views displayed stereoscopically and hierarchically and illustrating mutual relations among the directory structure views.

Now referring to FIG. 15, description will be directed to a typical method of handling inter-layer relations in the case where a plurality of network structure views and a directory structure view are displayed stereoscopically in hierarchical layers in the network management system according to the instant embodiment of the invention. Parenthetically, FIG. 15 shows the contents displayed in the three-dimensional display area 1904 described above by reference to FIG. 14.

In the physical network display plane 1010 for displaying the physical interconnection information, there is displayed an example of the physical network structure view showing three-dimensionally the physical interconnection relation of the networks handled by the network management system according to the instant embodiment of the invention.

More specifically, there are arrayed in the form of stereoscopic object icons on the three-dimensionally displayed plane 1010, an ATM (Asynchronous Transfer Mode) switch 1012, a router 1013 connected to the ATM switch 1012, a personal computer 1011 on which LECS is running, personal computers 1014a and 1014b on which LES is running, personal computers 1015a, . . . , 1015f on which LEC are running, a switch 1016 and connection 1019 to other network, respectively. Further, in order to indicate mutual connections among the machines or equipment, lines indicating the equipment interconnection relations are displayed among the individual object icons.

Displayed on the virtual network display plane 1020 for displaying the logical network configuration information is a typical virtual network structure view showing three-dimensionally implementation statuses of virtual network segments of the network, as handled by the network management system according to the invention.

More specifically, shown on the virtual network display plane 1020 as the virtual network segments are emulated LANs 1027a and 1027b as well as VLANs 1028a and 1028b in the form of closed areas, respectively, wherein servers and clients constituting the virtual network are shown as stereoscopical object icons, respectively. In more concrete, the LECS 1021 and the LESs 1024a and 1024b are shown as server objects of the LAN emulation as connected to the ATM while the LESs 1025a, . . . , 1025f and the Ethernet switch apparatus 1022 are shown as the client objects, respectively. It can further be seen that lines are displayed for indicating server-client relations between the server objects and the client objects, respectively.

The user display 1040 is generated in dependence on the users and the departments or sections of an organization to which the users belongs. In the case of the example illustrated in FIG. 10, the directory data are displayed three-dimensionally in the form of a directory data structure 81. Two departments "Department #1" and "Department #2" mentioned previously by reference to FIG. 10 are shown as the closed areas, respectively. On the other hand, sections "Section #1" and "Section #2" are shown in the form of closed areas 1048a and 1048b, respectively. The ranking relation among the individual areas and the affiliations of the users are indicated by subsumptive relations among the closed areas, respectively. Thus, the individual users 1045a, . . . , 1045f are disposed within the closed areas indicating the departments or sections to which the users belong, respectively.

Arrows 1401a; 1401b and 1402a; 1402b represent relations or associations among the objects shown as the stereoscopical object icons in a plurality of network structure views. By way of example, the arrow 1401b indicates that in the virtual network, the user 1045a is a same entity as the LEC computer 1025a which belongs to the virtual segment 1027a. Further, the arrow 1401c indicates that in the physical network, the LEC computer 1025a is a same entity as the computer 1015a. Similarly, correspondence relations among the user 1045c, the computer 1025c on the virtual network and the computer 1015a on the physical network are indicated by the arrows 1402b and 1402c, respectively.

Figure 16:
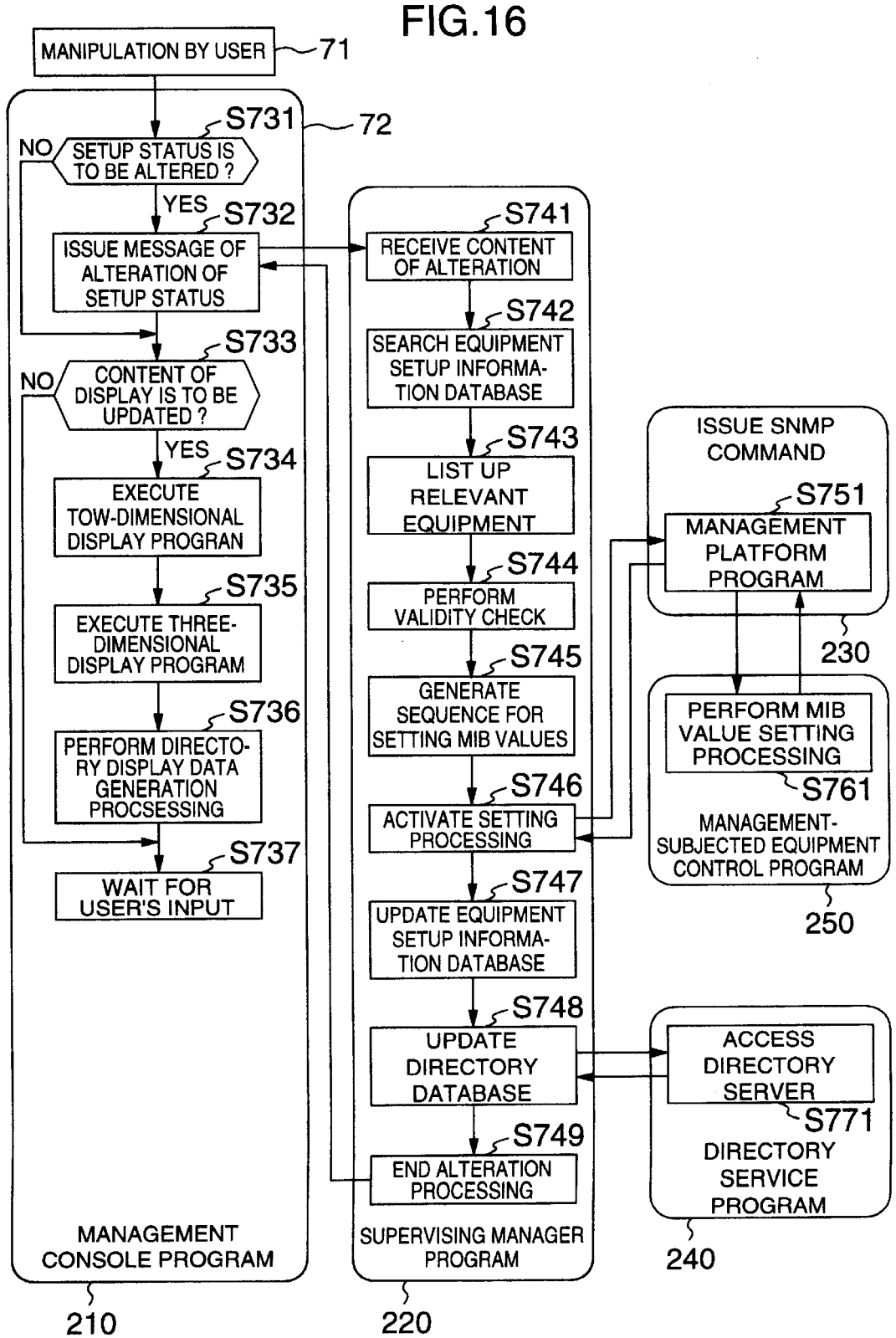
FIG. 16 is a flow chart for illustrating processings involved in setting the information concerning the network equipment in response to a command for altering the network configuration or structure up to the display of updated network structure information in the network management system according to the invention.

Next, referring to FIG. 16, description will be made of a flow of processings involved in setting the information concerning the individual network equipment up to the generation of display of the information concerning an altered or updated network structure or configuration in response to a user's command demanding alteration or change of the network configuration in the network management system according to the invention.

In a step S71, when user inputs a command for alteration or change or modification of the network configuration, processings according to the instant embodiment of the invention is started.

In a step S731, the management console program 210 decides whether or not the user's command indicates alteration of the network configuration. Unless the ommand indicates the alteration, i.e., when the decision tep S731 results in negation "NO", the processing proceeds to a step S733.

When the network configuration being set up is to be altered, the management console program 210 messages or informs the supervising manager program 220 of the contents of the alteration.

Upon reception of the message informing the alteration, the supervising manager program 220 acquires the contents of alteration in a step S741.

In succession, the supervising manager program 220 searches the equipment setup information database 221 in a step S742.

In a step S743, the supervising manager program 220 lists up the machines or equipment for which the setup status is to be altered.

Subsequently, the supervising manager program 220 checks validity of the contents of the alteration as well as the validity of the setup status updating processing in a step S744.

In a step S745, the supervising manager program 220 generates a sequence of the equipment setup information (MIB (Management Information Base) values).

In succession, in a step S746, the supervising manager computer 22 activates the setup processing while informing the management platform program 230 of the setup processing.

In a step S751, the management platform program 230 issues the SNMP command to the individual management-subjected equipment control programs 250, respectively, in accordance with the setup processing information issued by the supervising manager program 220.

In a step S761, the management-subjected equipment control program 250 executes the setup processing in accordance with the equipment setup information (MIB values) in response to the SNMP command issued by the management platform program 230. Upon completion of the setup processing, information concerning completion of the setup processing is sent to the supervising manager program 220 through the medium of the management platform program 230 and received by the former through the processing in a step S746.

In succession, in a step S747, the supervising manager computer 22 updates the contents of the equipment setup information database 221.

Additionally, in a step S748, the supervising manager program 220 issues a request to the directory service program 240 for updating the contents of the directory database 241.

Upon reception of the content updating request mentioned above, the directory service program 240 makes access to the directory server module 242 to update the contents of the directory database 241 in a step S771.

On the other hand, the supervising manager program 220 terminates the alteration or updating processing in a step S749.

Upon reception of the information of completion of the alteration processing, the management console program decides whether or not the contents of display is to be updated in a step S733. When the display is not to be updated, the processing proceeds to a step S736.

By contrast, when the content of display is to be updated, the management console program 210 executes the two-dimensional display program for altering or modifying the content of display, to thereby generate two-dimensional display data on the screen of the output device 36 such as the display device of the management console computer 21 in a step S734.

In a step S735, the management console program 210 executes the three-dimensional display program to alter the content of display, for thereby generating the three-dimensional display data on the screen of the output device 36 such as the display screen of the management console computer 21.

Furthermore, in a step S736, the management console program 210 executes the directory display data generating processing for generating the directory display data on the screen of the output device 36 such as the display screen of the management console computer 21.

Thereafter, the processing of the management console program 210 makes transition to a step S737 where the user's input is waited for.

Next, referring to FIG. 17, description will be made of a flow of processings for identifying the network equipment and searching or retrieving the MAC (Media Access Control) addresses intrinsic to network cards each mounted on the equipment by making use of the dynamic virtual network altering facility, for thereby acquiring topology information which represents the physical-interconnection relations of the network equipment in the network management system according to the invention.

Figure 17:
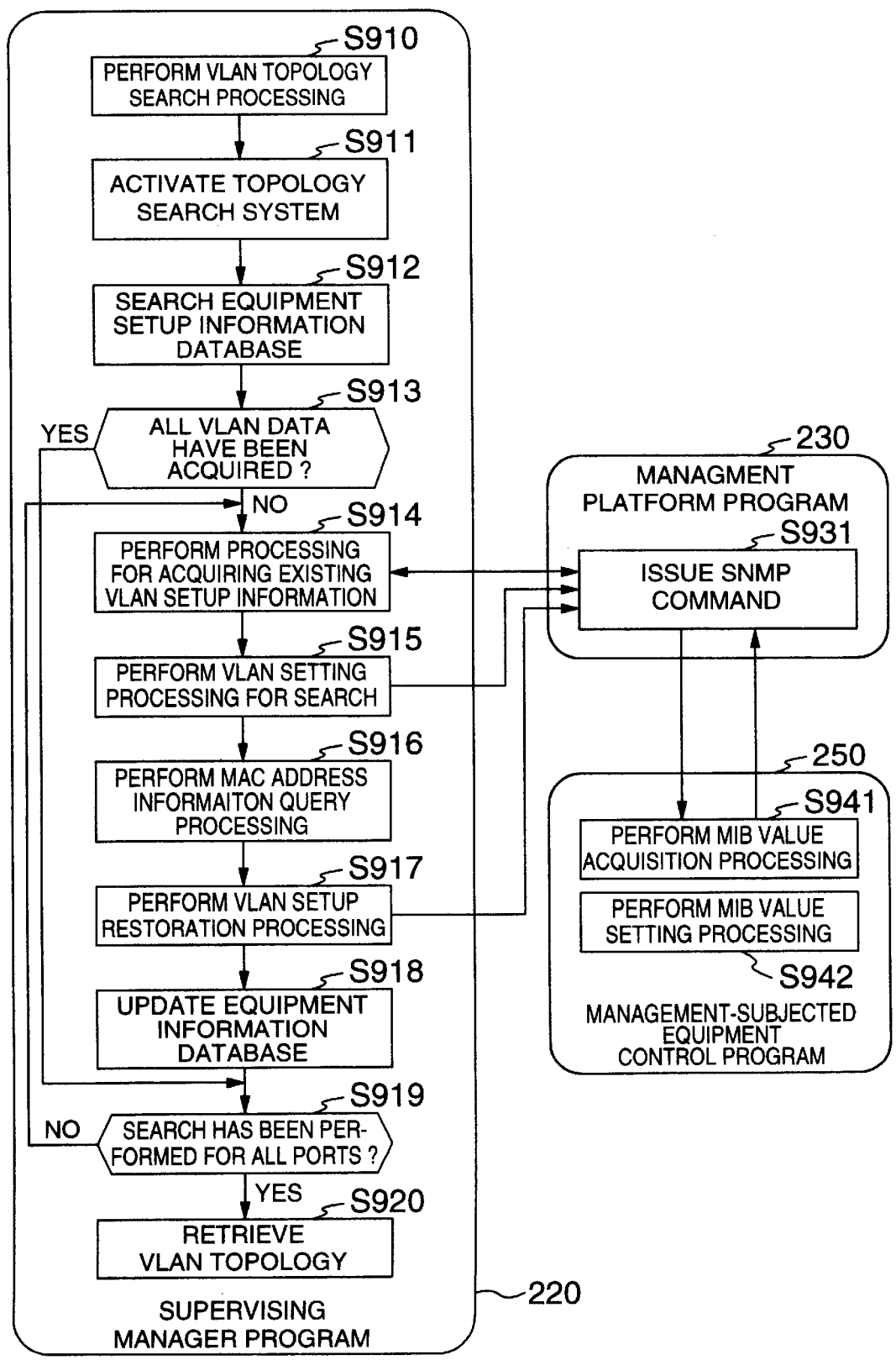
FIG. 17 is a flow chart for illustrating a flow of processings for retrieving MAC addresses inherent to network cards mounted on individual equipment by making use of dynamic structure alteration susceptibility of the virtual network in the network management system according to the invention.

Referring to FIG. 17, in a step S910, the supervising manager program 220 responds to activation of the VLAN topology search by activating a topology search system in a step S911.

In succession, the supervising manager program 220 executes a processing for retrieving the setup information of the individual network equipment.

At that time, the supervising manager program 220 decides in a step S913 whether or not the setup information of all the LANs have been acquired while confirming the interconnection relations of the equipment on all the LANS. When it is decided that the setup information of the equipment on all the LANs have already been acquired, the processing proceeds to a step S919.

By contrast, when it is decided that the setup information of the equipment on all the LANs have not been acquired yet, i.e., when the interconnection relations among the equipment have not defined yet is found, the supervising manager program 220 activates existing VLAN setup information acquisition processing for saving temporarily the information concerning the current virtual network configuration, whereon request for the acquisition processing of the setup information is issued to the management platform program 230 in a step S914.

The management platform program 230 issues the SNMP command to the management-subjected equipment control programs 250, respectively, in response to the request for the setup information acquisition processing issued by the supervising manager program 220 in a step S931.

Each of the management-subjected equipment control programs 250 executes the equipment setup information (MIB value) acquisition processing in response to the SNMP command from the management platform program 230 in a step S941. The equipment setup information (MIB value) as acquired is then sent through the medium of the management platform program 230 to the supervising manager program 220, which receives the information through the processing in the step S914.

Next, in a step S915, the supervising manager program 220 activates the setup processing for the searching or retrieving VLAN and issues a message of the processing for setting the setup information for the management platform program 230.

In a step S931, the management platform program 230 issues the SNMP command to the individual management-subjected equipment control programs 250, respectively, in accordance with the setup processing information issued by the supervising manager program 220. In that case, the management platform program 230 alters dynamically the virtual networks managed by the equipment by performing the control for retrieving the individual network ports.

In a step S942, the management-subjected equipment control program 250 executes the setup processing in accordance with the equipment setup information (MIB values) in response to the SNMP command issued by the management platform program 230. Upon completion of the setup processing, information concerning completion of the setup processing is sent to the supervising manager program 220 through the medium of the management platform program 230.

In that case, the supervising manager program 220 executes the MAC address information query processing in a step S916. In other words, the supervising manager program 220 can grasp the inter-equipment connection relations by retrieving the MAC addresses of the equipment connected to the ports, respectively.

Next, in a step S917, the supervising manager program 220 executes a processing for restoring the original virtual network configuration after completion of a series of the processings described above.

Furthermore, in a step S918, the supervising manager computer 22 updates the contents of the equipment setup information database 221.

Now, description will be made of an exemplary object management table indicating the interconnection status of the network which results from the updating step S918 and which is stored in the equipment setup information database 221.

The object management table 60 contains a list of MAC addresses 61 employed for identification of the objects, a list of computer names 62 used as the names representing the objects, respectively, a list of logical address allocation statuses 63 indicating the addresses allocated to the individual objects and a list of given statuses 64. Each of the objects is identified by the intrinsic MAC address allocated to the port of the equipment and can be managed independent of the allocation status of the logical network addresses. The object management table 60 is generated by the supervising manager program 220 and stored in the equipment setup information database 221 of the supervising manager computer 22.

Now, turning back to FIG. 17, the supervising manager program 220 makes decision as to whether or not the search has been completed for all the ports. Unless the search has been completed, the steps S914 et seq. are executed repeatedly. When the search has been completed, the VLAN topology search processing comes to an end.

As will now be appreciated from the foregoing description, according to the teachings of the present invention incarnated in the illustrated embodiment, the interconnection relation of the physical network equipment, logical structure information of the virtual networks and the user information can be stored in the directory service data. By virtue of such arrangement, the setup of the virtual network can be referenced or supervised or altered easily at one location or place in a consolidated manner.

By using the management console computer capable of generating the two-dimensional or three-dimensional display, the configuration of the logical network segments based on the virtual network and the physical network configuration implemented through physical wiring of the equipment can be managed will very high reliability and accuracy while establishing concurrently the correspondences, respectively, to the logical network configurations as viewed from various upper-rank protocols.

Additionally, the information concerning the physical interconnection relations among the network equipment, the information concerning the logical virtual network configuration and the user information can be searched and altered in a consolidated manner by using as the key the MAC addresses allocated to the physical network equipment even when the information mentioned above can not be acquired directly by resorting to the SNMP or like means.

Besides, by making use of the database, the logical network segment configuration based on the virtual network, the physical network configuration as viewed from various upper-rank protocols can be managed while establishing concurrently correspondences thereamong by using as the keys the MAC addresses allocated to the physical network configuration, respectively.

Thus, according to the teachings of the present invention management of the network including the virtual networks implemented in conformance with plural schemes or standards can be carried out easily.

What is claimed is:

1. A network management system for managing a network, comprising:

management means coupled to equipments on a network; and a database storing therein interconnection information related to a physical connection between said equipments, and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from other of the plurality of virtual networks, and user information of users of said network;

wherein said management means comprising: an interface which obtains, from said equipments, information of a plurality of IDs of said equipments, a physical connection between said equipments, a plurality of IDs of said logical equipment and a logical connection between said logical equipments; and a processor which manages said interconnection information stored in said database, based on said IDs of said equipments, said physical connection between said equipments, said IDs of said logical equipments and said logical connection between said logical equipments, wherein said management means manages said interconnection information based on setup information from said equipment on a network; and wherein said management means obtains said interconnection information from said database to inform to a display coupled to said management means thereby to display concurrently on the display said interconnection information related to physical connections among said equipment coupled to said management means, said logical topology of said plurality of virtual networks including said at least one using a packaging scheme different from the other virtual networks, and user information of users of said network.

2. A network management system according to claim 1, wherein said management means controls to inform said equipment indicated by a designation to change setup of said equipment of setup information to update said corresponding relation information and inform said display of said updated corresponding relation information.

3. A network management system according to claim 2, wherein said management means searches information of said physical connection among said equipment coupled to said management means, said logical topology of said virtual networks, and said user information of users of said network with a key of physical address allotted to said equipment on said network.

4. A network management system according to claim 2, wherein said corresponding relation information has corresponding information of hierarchical directory data among said physical connection among said equipment coupled to said management means, said logical topology of said virtual networks, and said user information of users of said network.

5. The network management system according to claim 1, wherein said setup information is informed of from said management means which gather and/or send said setup information from/to equipment on a network.

6. A network management system according to claim 1, wherein said at least one virtual network of different packaging scheme is one of a VLAN and a LAN emulation.

7. A network management system for managing a network, comprising:

management means coupled to and managing equipments on a network;

a database storing therein interconnection information related to a physical connection between said equipments and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from other of the plurality of virtual networks, and user information of users of said network; and a display for displaying information received from said management means;

wherein said management means comprises an interface which obtains, from said equipments, information of a plurality of IDs of said equipments, a physical connection between said equipments, a plurality of IDs of said logical equipment and a logical connection between said logical equipments; and a processor which manages said interconnection information stored in said database, based on said IDs of said equipments, said physical connection between said equipments, said IDs of said logical equipments and said logical connection between said logical equipments; and wherein said display displays said interconnection information related to physical connections among said devices, a logical topology of said plurality of virtual networks, and user information of users of said network together with interconnections thereof to establish correlation thereamong on a screen.

8. The network management system according to claim 7, wherein said setup information is informed of from said management means which gather and/or send said setup information from/to equipment on a network.

9. A network management system according to claim 7, wherein said at least one virtual network of different packaging scheme is one of a VLAN and a LAN emulation.

10. A network management system according to claim 7, wherein said display displays information concerning physical connections of equipment on the network, information concerning logical network configuration including said different packaging scheme, and information concerning users who make use of the network correspondingly on a screen.

11. A network management method for managing a network, comprising the steps of:

receiving a request to change a setup of said network;

deciding a device necessary to change setup thereof on said network based on said request;

controlling to change setup of said device based on said request;

controlling to change contents of a database storing interconnection information of related to physical connection between said equipments coupled to said management means, and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from the other virtual networks, and user information of users of said network; and outputting said changed contents, said outputting including:

outputting said information of said among physical connection among said equipment coupled to said management means, said logical configuration of said network, and said user information of users of said network on respective regions of a display; and outputting information of corresponding relation among said physical connection among said eguipment coupled to said management means, said logical topology of said virtual networks, and said user information of users of said network between said respective regions of said display.

12. A network management method according to claim 11, wherein said at least one virtual network of different packaging scheme is one of a VLAN and a LAN emulation.

13. A network management method according to claim 11, further comprising a step of displaying information concerning physical connections of equipment on the network, information concerning logical network configuration including said different packaging scheme, and information concerning users who make use of the network correspondingly on a screen.

14. A computer program product to be stored in a storage medium with instructions for managing a network, the instructions when executed causing a computing device to perform:

receiving a request to change a setup of said network;

deciding a device necessary to change setup thereof on said network based on said request;

controlling to change setup of said device based on said request;

controlling to change contents of a database storing interconnection information related to physical connection between said equipments coupled to said management means, and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from the other virtual networks, and user information of said network;

outputting said changed contents;

outputting said information of said among physical connection among said equipment coupled to said management means, said logical topology of said virtual networks, and said user information of users of said network on respective regions of a display; and outputting interconnection information related to said physical connections among said equipment coupled to said management means, said logical topology of said virtual networks, and said user information of users of said network between said respective regions of said display.

15. A computer program product according to claim 14, wherein said at least one virtual network of different packaging scheme is one of a VLAN and a LAN emulation.

16. A computer program product according to claim 14, the instructions when executed causing a computing device to perform:

displaying information concerning physical connections of equipment on the network, information concerning logical network configuration including said different packaging scheme, and information concerning users who make use of the network correspondingly on a screen.

17. A computer program product to be stored in a storage medium with instructions for managing a network, the instructions when executed causing a computing device to perform:

receiving a request to change a setup of said network;

deciding a device necessary to change setup thereof on said network based on said request;

controlling to change setup of said device based on said request;

controlling to change contents of a database storing interconnection information related to physical connection between equipments coupled to a management means, and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from the other virtual networks, and user information of users of said network; and outputting said changed contents, wherein said computing device comprises a management computer coupled to a plurality of equipments, comprising:

an interface which obtains, from any of said equipments, information of a plurality of IDs of said equipments, a physical connection between said equipments, a plurality of IDs of a logical equipment, which is assigned at least one ID to said each equipment between/among a plurality of logical segments based on predetermined specification of equipment setup data, and a logical connection between said logical equipments; and a processor which manages information of a physical topology between said equipments, a logical topology between said logical equipments, and assignment to said logical equipment for said each equipment, based on said information of said IDs of said equipments, said physical connection between said equipments, said IDs of said logical equipments and said logical connection between said logical equipments, wherein said management means obtains said interconnection information from said database to inform to a display coupled to said management means thereby to display concurrently on the display said interconnection information related to physical connections among said equipment coupled to said management means, said logical topology of said plurality of virtual networks including said at least one using a packaging scheme different from the other virtual networks, and user information of users of said network.

18. A network management system for managing a network, comprising:

management means coupled to equipments on a network; and a database storing therein interconnection information related to a physical connection between said equipments, and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from the other virtual networks, and user information of users of said network;

wherein said management means comprising: an interface which obtains, from said equipments, information of a plurality of IDs of said equipments, a physical connection between said equipments, a plurality of IDs of said logical equipment and a logical connection between said logical equipments; and a processor which manages said interconnection information stored in said database, based on said IDs of said equipments, said physical connection between said equipments, said IDs of said logical equipments and said logical connection between said logical equipments, said processor including a management program medium having computer program codes stored therein and running on the processor which reads the program codes, said program codes comprising:

first codes causing the interface to obtain, from any of said equipments, information of a plurality of IDs of said equipments, a physical connection between said equipments, a plurality of IDs of a logical equipment, which is assigned at least one ID to said each equipment between/among a plurality of logical segments based on predetermined specification of equipment setup data, and a logical connection between said logical equipments; and second codes causing the processor to manage information of a physical topology between said equipments, a logical topology between said logical equipments, and assignment to said logical equipment for said each equipment, based on said information of said IDs of said equipments, said physical connection between said equipments, said IDs of said logical equipments and said logical connection between said logical equipments, wherein said management means obtains said interconnection information from said database to inform to a display coupled to said management means thereby to display concurrently on the display said interconnection information related to physical connections among said equipment coupled to said management means, said logical topology of said plurality of virtual networks including said at least one using a packaging scheme different from the other virtual networks, and user information of users of said network.

19. A network management system for managing a network, comprising:

management means coupled to equipments on a network; and a database storing therein interconnection information related to a physical connection between said equipments, and a logical topology between logical equipments, one of which is assigned at least one ID to each of said equipments between/among a plurality of logical segments based on predetermined specification of equipment setup data, assignment to said logical equipment for said each equipment and attribution of user assigned to said each equipment, said logical topology of a plurality of virtual networks, at least one of which using a packaging scheme different from the other virtual networks, and user information of users of said network;

wherein said management means comprising: an interface which obtains, from said equipments, information of a plurality of IDs of said equipments, a physical connection between said equipments, a plurality of IDs of said logical equipment and a logical connection between said logical equipments; and a processor which manages said interconnection information stored in said database, based on said IDs of said equipments, said physical connection between said equipments, said IDs of said logical equipments and said logical connection between said logical equipments, the processor performing a data management method for a computer, comprising the steps of:

causing the interface to obtain, from any of said equipments, information of a plurality of IDs of said equipments, a physical connection between said equipments, a plurality of IDs of a logical equipment, which is assigned at least one ID to said each equipment between/among a plurality of logical segments based on predetermined specification of equipment setup data, and a logical connection between said logical equipments; and managing information of a physical topology between said equipments, a logical topology between said logical equipments, and assignment to said logical equipment for said each equipment, based on said information of said IDs of said equipments, said physical connection between said equipments, said IDs of said logical equipments and said logical connection between said logical equipments, wherein said management means obtains said interconnection information from said database to inform to a display coupled to said management means thereby to display concurrently on the display said interconnection information related to physical connections among said equipment coupled to said management means, said logical topology of said plurality of virtual networks including said at least one using a packaging scheme different from the other virtual networks, and user information of users of said network.

* * * * *